US012626091B2

(12) United States Patent

Principe et al.

(10) Patent No.: US 12,626,091 B2

(45) Date of Patent: May 12, 2026

(54) CONFIGURATION PROCESS FRAMEWORK FOR MACHINE LEARNING MODELS

(71) Applicant: University of Florida Research Foundation, Incorporated, Gainesville, FL (US)

(72) Inventors: Jose C. Principe, Gainesville, FL (US); Bo Hu, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 757 days.

(21) Appl. No.: 18/052,400

(22) Filed: Nov. 3, 2022

(65) Prior Publication Data

US 2023/0153573 A1 May 18, 2023

Related U.S. Application Data

(60) Provisional application No. 63/280,505, filed on Nov. 17, 2021.

(51) Int. Cl.
*G06F 16/00* (2019.01)
*G06N 3/04* (2023.01)
*G06N 3/08* (2023.01)

(52) U.S. Cl.
CPC ................. *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 8,965,819 B2 * | 2/2015 | Tirunagari | G06F 12/121 |
| | | | 706/15 |
| 9,235,799 B2 * | 1/2016 | Yu | G06N 3/09 |
| 11,276,500 B2 * | 3/2022 | Styner | G06N 3/0499 |
| 2013/0138436 A1 * | 5/2013 | Yu | G06N 3/08 |
| | | | 704/E15.017 |

(Continued)

FOREIGN PATENT DOCUMENTS

| | | | | |
|---|---|---|---|---|
| CN | 112534452 A | * | 3/2021 | G06N 3/042 |

*Primary Examiner* — Jean M Corrielus

(74) *Attorney, Agent, or Firm* — ALSTON & BIRD LLP

(57) ABSTRACT

Various embodiments are directed to configuring or training deep neural network (DNN) machine learning models comprising one or more hidden layers and an output layer. Various embodiments provide technical advantages in training DNN machine learning models, including improved computational efficiency and guaranteed optimality. In one embodiment, an example method includes identifying a nonlinear-model-based representation for each hidden layer, which may be a Bank of Wiener Models, a nonlinear units of the hidden layer, and/or the like. The method further includes individually and sequentially configuring the hidden layers, each configured by determining a correlation measure (e.g., a correlation ratio) between the layer output and a target signal. Parameters of the particular hidden layer are modified by maximizing the correlation measure to yield maximal correlation over the space of functions. The method further includes performing automated tasks using the DNN machine learning model after configuring its parameters on a training set.

23 Claims, 8 Drawing Sheets

(56) References Cited

U.S. PATENT DOCUMENTS

| | | | |
|---|---|---|---|
| 2015/0127336 A1* | 5/2015 | Lei | G10L 17/18 |
| | | | 704/232 |
| 2016/0260428 A1* | 9/2016 | Matsuda | G06N 3/04 |
| 2017/0337464 A1* | 11/2017 | Rabinowitz | G06N 3/0985 |
| 2020/0074273 A1* | 3/2020 | Schmidt | G06N 3/0455 |
| 2021/0201116 A1* | 7/2021 | Rabinowitz | G06N 3/0475 |
| 2022/0076136 A1* | 3/2022 | Passban | G06N 3/088 |
| 2022/0382723 A1* | 12/2022 | Rama | G06N 3/0499 |

* cited by examiner

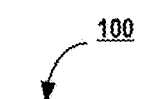
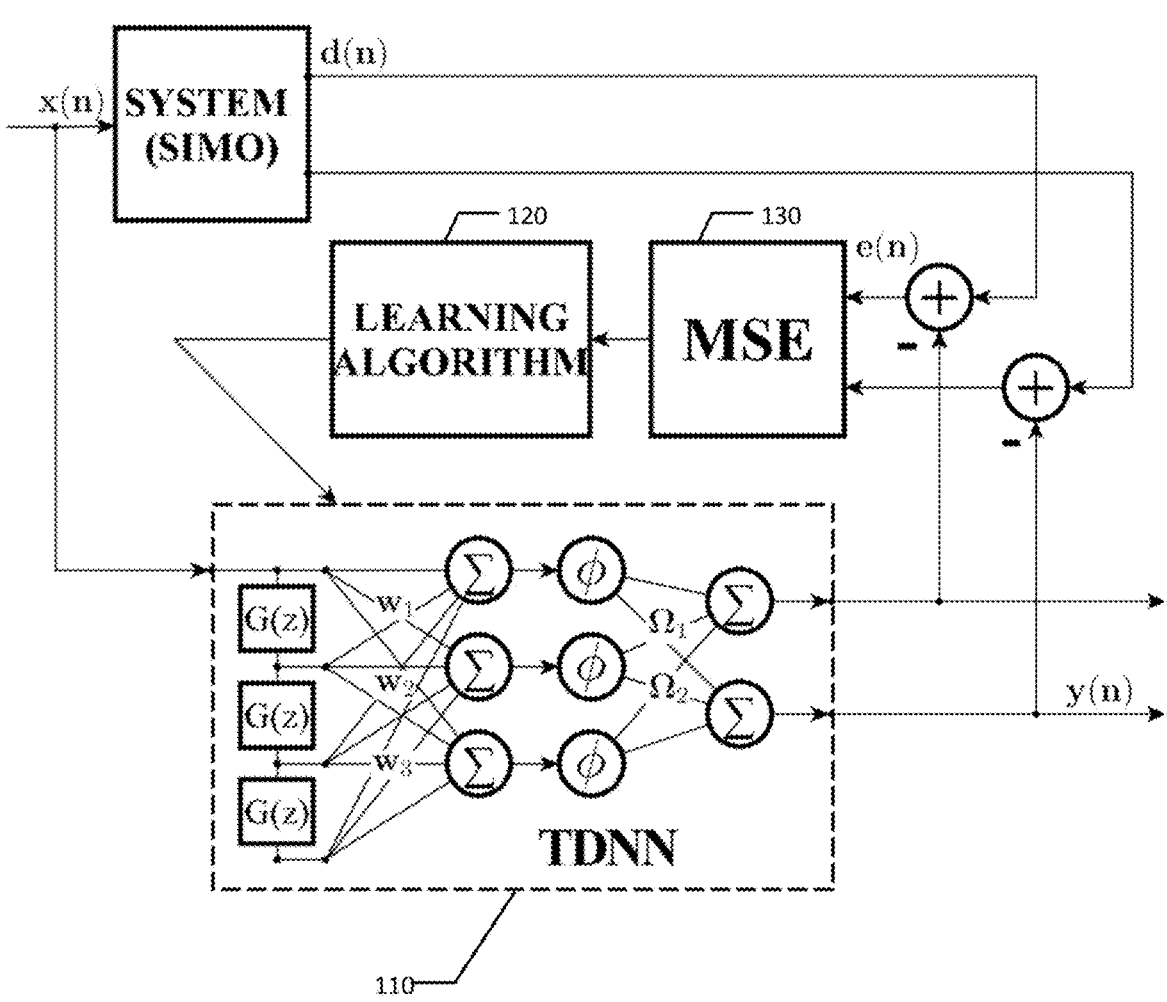
FIG. 1

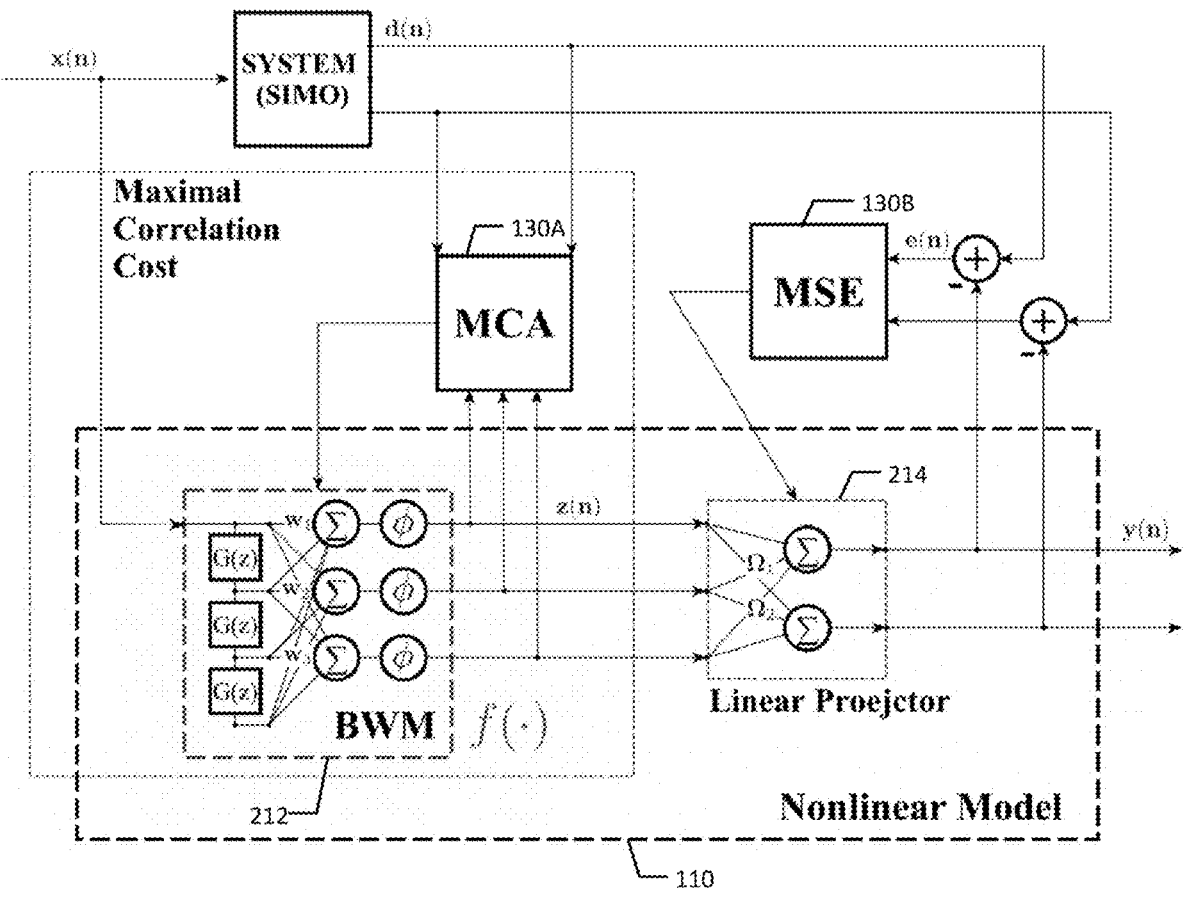
FIG. 2

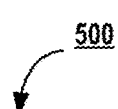

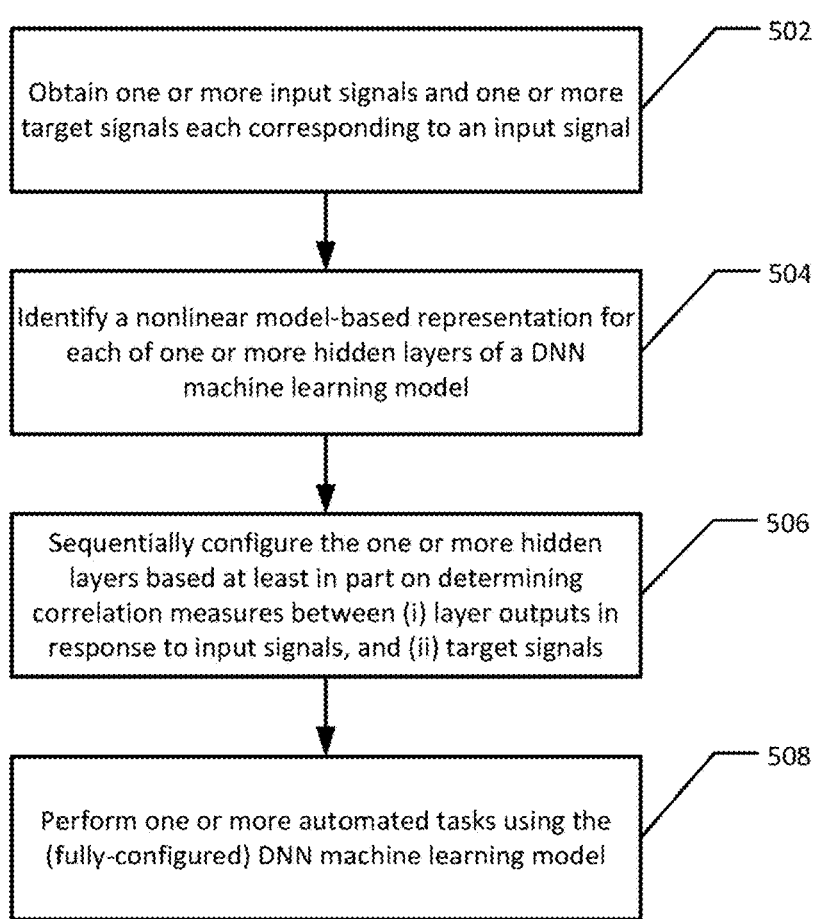

500

502

Obtain one or more input signals and one or more target signals each corresponding to an input signal

504

Identify a nonlinear model-based representation for each of one or more hidden layers of a DNN machine learning model

506

Sequentially configure the one or more hidden layers based at least in part on determining correlation measures between (i) layer outputs in response to input signals, and (ii) target signals

508

Perform one or more automated tasks using the (fully-configured) DNN machine learning model

FIG. 5

(a) Impact of the batch size (b) Impact of moments estimators

CONFIGURATION PROCESS FRAMEWORK FOR MACHINE LEARNING MODELS

REFERENCE TO RELATED APPLICATIONS

This application claims priority to and the benefit of U.S. Provisional Application No. 63/280,505, filed on Nov. 17, 2021, the entire contents of which are incorporated herein by reference.

GOVERNMENT SUPPORT

This invention was made with government support under N00014-21-1-2345 awarded by The US Navy Office of Naval Research and under FA9453-18-1-0039 awarded by the US Air Force Research Laboratory. The government has certain rights in the invention.

TECHNOLOGICAL FIELD

Embodiments of the present disclosure generally relate to configuration (e.g., training) of machine learning models, for example, deep machine learning models or deep neural network (DNN) machine learning models.

BACKGROUND

Various embodiments of the present disclosure address technical challenges relating to efficiency, accuracy and optimality of existing methods for training DNN machine learning models, such as backpropagation and the use of mean-square error.

BRIEF SUMMARY

Various embodiments of the present disclosure are directed to improved configuration or training of DNN machine learning models. In particular, various embodiments provide a modularized configuration framework or process for training a DNN machine learning model that preserves or improves accuracy of the DNN machine learning model due to high-resolution control and transparency. Various embodiments provided herein improve upon existing processes and frameworks for configuring a DNN machine learning model.

For example, backpropagation is understood by those of skill in the field of the present disclosure as a standard methodology of training DNN machine learning models and involves tuning of parameters of layers of a DNN machine learning model directly from data in supervised training. However, backpropagation introduces various weaknesses, such as simultaneous and non-specific training of all layers of a DNN machine learning model, non-guaranteed optimality, slow convergence, and low explainability, for example.

Accordingly, various embodiments described herein provide a modularized configuration framework for training a DNN machine learning model that provides various technical advantages over existing training processes. In doing so, various embodiments involve modularization and individual configuration of different layers of the DNN machine learning model. Various embodiments additionally involve determination of correlation measures in order to individually configure a particular layer of the DNN machine learning model, which reduces overall computational complexity, enables greater explainability, and provides improved convergence during training of the DNN machine learning model.

In general, according to one aspect, embodiments of the present invention feature a computer-implemented method for configuring a deep neural network (DNN) machine learning model comprising one or more hidden layers and an output layer, the various steps of the method being performed using a processor. One or more input signals and one or more target signals each corresponding to an input signal are received. A nonlinear-model-based representation for each hidden layer of the DNN machine learning model is selected. At least a selected subset of the one or more hidden layers of the DNN machine learning model are sequentially configured. Here, a particular hidden layer is independently configured, before configuring subsequent hidden layers of the selected subset, by constructing a correlation measure based at least in part on (i) a layer output of the particular hidden layer in response to a given input signal, and (ii) a given target signal corresponding to the given input signal, modifying one or more parameters of the nonlinear-model-based representation for the particular hidden layer based at least in part on maximizing the correlation measure, and fixing the one or more modified parameters of the nonlinear-model-based representation for the particular hidden layer. The performance of one or more automated tasks using the DNN machine learning model is initiated.

In some embodiments, sequentially configuring the one or more hidden layers comprises fixing the modified parameters of the nonlinear-model-based representation for the particular hidden layer before modifying parameters of a nonlinear-model-based representation for a subsequent hidden layer.

In one example, the output layer may be a final projection layer that is configured subsequent to the sequential configuration of at least the selected subset of the one or more hidden layers of the DNN machine learning model, the output layer being configured based at least in part on a least square projection.

In another example, the output layer may be a final projection layer that is configured subsequent to the sequential configuration of at least the selected subset of the one or more hidden layers of the DNN machine learning model, the output layer being configured based at least in part on maximizing the correlation measure with the target signal.

In one embodiment, the correlation measure may be a correlation ratio between (i) the layer output of the particular hidden layer in response to the given input signal, and (ii) the given target signal corresponding to the given input signal.

In one embodiment, a nonlinear-model-based representation for a hidden layer may comprise a plurality of block-oriented nonlinear models. Here, at least one of the plurality of block-oriented nonlinear models is a Hammerstein-Wiener model.

In one embodiment, at least one hidden layer of the DNN machine learning model may be substituted by a nonlinear mapping of the one or more input signals to a reproducing kernel Hilbert space (RKHS) where a linear weighting of a plurality of projections is configured by maximizing the correlation measure with the target signal.

In one embodiment, the final projection layer may be further configured using a combination of one or more outputs from the one or more hidden layers.

In one embodiment, the layer output of the particular hidden layer in response to the given input signal may be determined directly from the output of a preceding hidden layer.

In one embodiment, the layer output of the particular hidden layer in response to the given input signal may be determined based at least in part on a combination of one or more outputs of one or more preceding layers.

In general, according to another aspect, embodiments of the present invention feature an apparatus for configuring a deep neural network (DNN) machine learning model comprising one or more hidden layers and an output layer. The apparatus comprises at least one processor and at least one memory including program code, the at least one memory and the program code are configured to, with the processor, cause the apparatus to perform a series of steps, as follows. The apparatus may receive one or more input signals and one or more target signals each corresponding to an input signal and selects a nonlinear-model-based representation for each hidden layer of the DNN machine learning model. The apparatus then sequentially configures at least a selected subset of the one or more hidden layers of the DNN machine learning model. Here, a particular hidden layer is independently configured, before configuring subsequent hidden layers of the selected subset, by constructing a correlation measure based at least in part on (i) a layer output of the particular hidden layer in response to a given input signal, and (ii) a given target signal corresponding to the given input signal, modifying one or more parameters of the nonlinear-model-based representation for the particular hidden layer based at least in part on maximizing the correlation measure, and fixing the one or more modified parameters of the nonlinear-model-based representation for the particular hidden layer. The apparatus initiates the performance of one or more automated tasks using the DNN machine learning model.

In general, according to another aspect, embodiments of the present invention provide a computer program product comprising at least one non-transitory computer-readable storage medium having computer-readable program code portions stored therein. In one embodiment, one executable portion is configured to receive one or more input signals and one or more target signals each corresponding to an input signal. Another executable portion is configured to select a nonlinear-model-based representation for each hidden layer of the DNN machine learning model. Another executable portion is configured to sequentially configure at least a selected subset of the one or more hidden layers of the DNN machine learning model, wherein a particular hidden layer is independently configured, before configuring subsequent hidden layers of the selected subset, by constructing a correlation measure based at least in part on (i) a layer output of the particular hidden layer in response to a given input signal, and (ii) a given target signal corresponding to the given input signal, modifying one or more parameters of the nonlinear-model-based representation for the particular hidden layer based at least in part on maximizing the correlation measure, and fixing the one or more modified parameters of the nonlinear-model-based representation for the particular hidden layer. Another executable portion is configured to initiate the performance of one or more automated tasks using the DNN machine learning model.

BRIEF DESCRIPTION OF THE DRAWINGS

Having thus described the present disclosure in general terms, reference will now be made to the accompanying drawings, which are not necessarily drawn to scale.

FIG. 1 provides a diagram describing an example configuration process of an example deep neural network

4

(DNN) machine learning model, according to an embodiment of the present disclosure.

FIG. 2 provides a diagram illustrating an example modularized configuration framework of an example DNN machine learning model based at least in part on determination of maximal correlation values, in accordance with an embodiment of the present disclosure.

Figure 3:
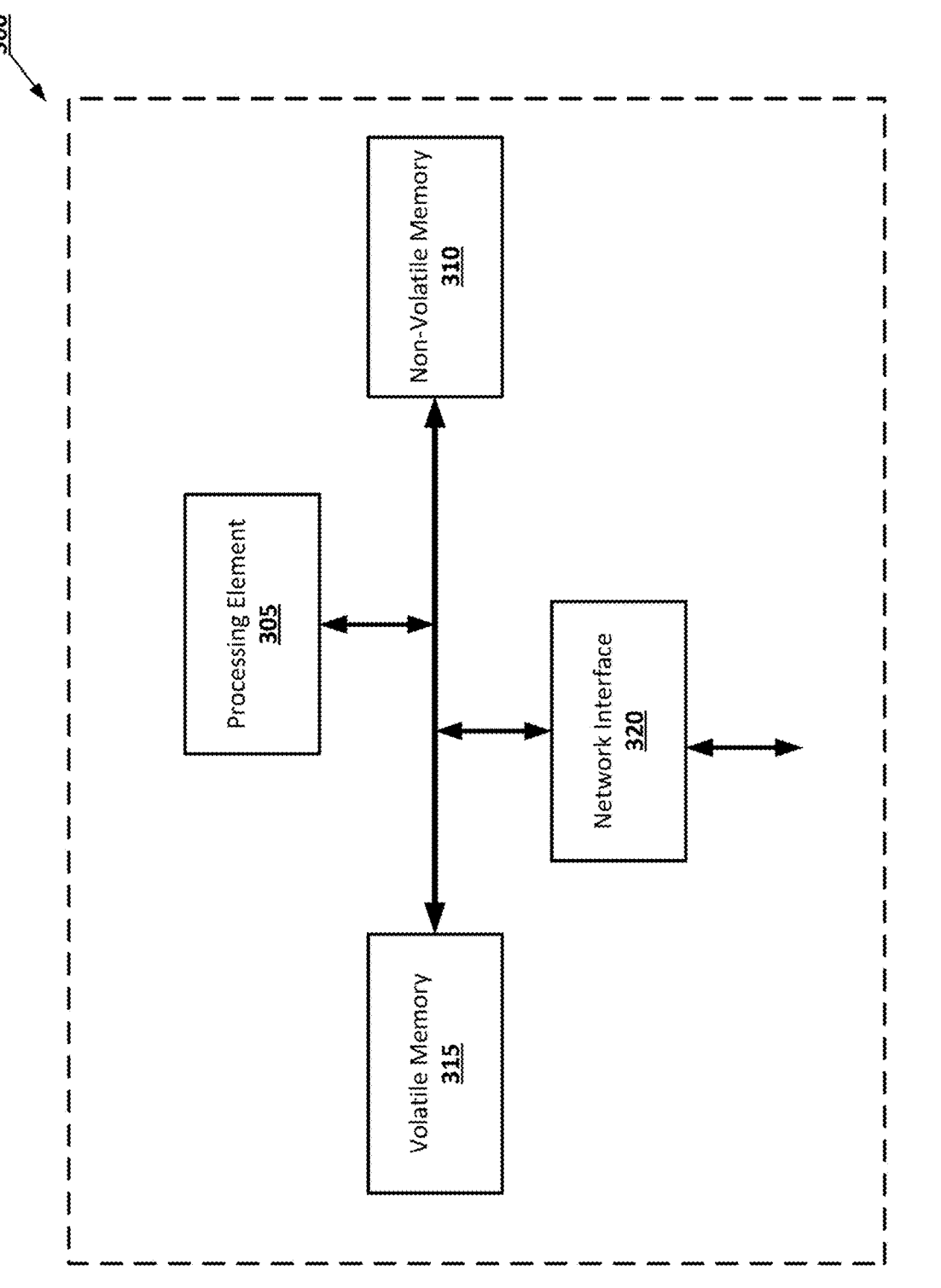

FIG. 3 provides a schematic diagram of a computing entity that may be used in accordance with various embodiments of the present disclosure.

FIG. 4 provides a diagram illustrating example layer cascading techniques for configuring modularized layers of a DNN machine learning model within an example modularized configuration framework, in accordance with an embodiment of the present disclosure.

FIG. 5 provides a flowchart illustrating operations for an example modularized configuration process for training a DNN machine learning model, according to an embodiment of the present disclosure.

Figure 6:
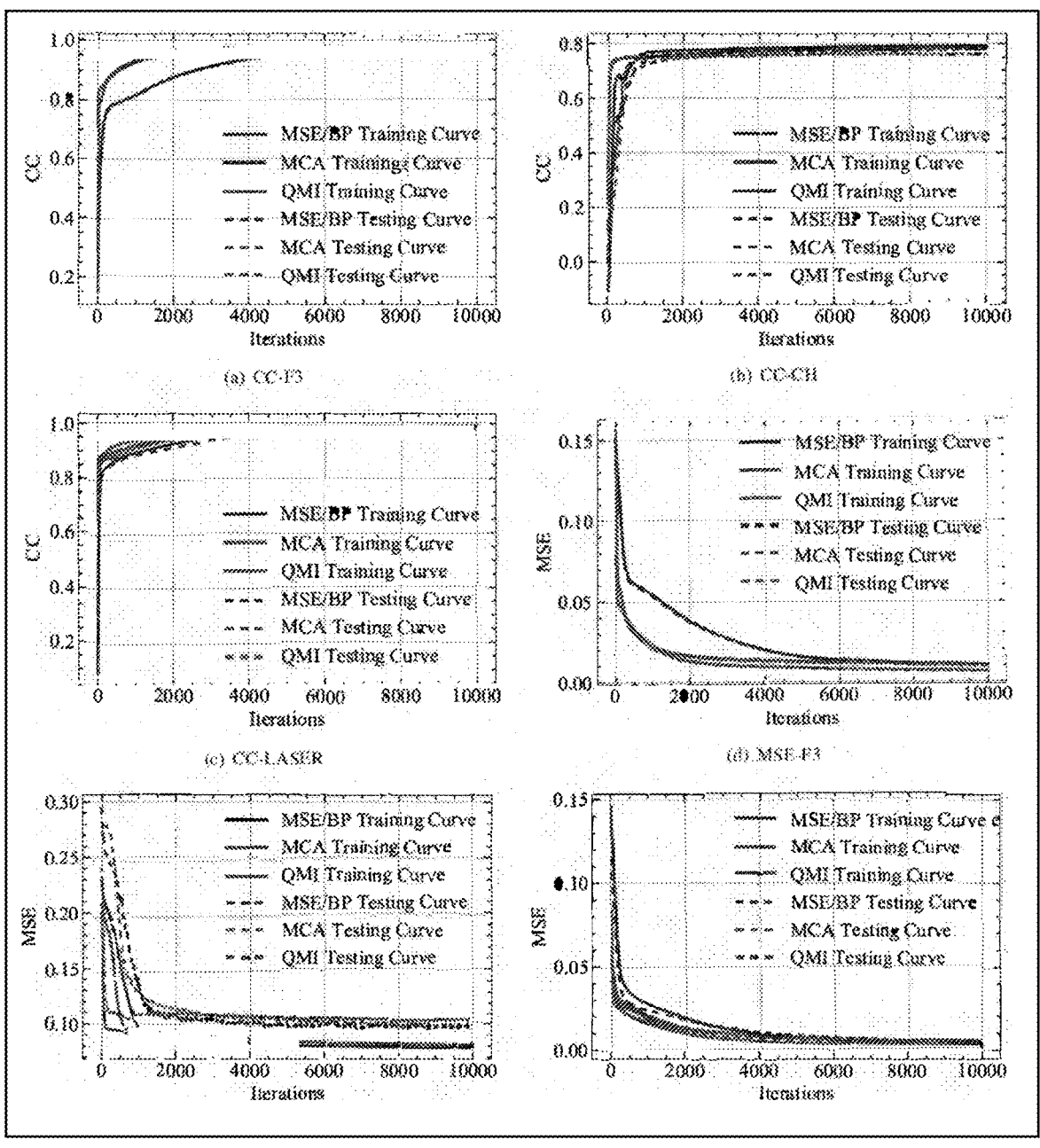
Figure 7:
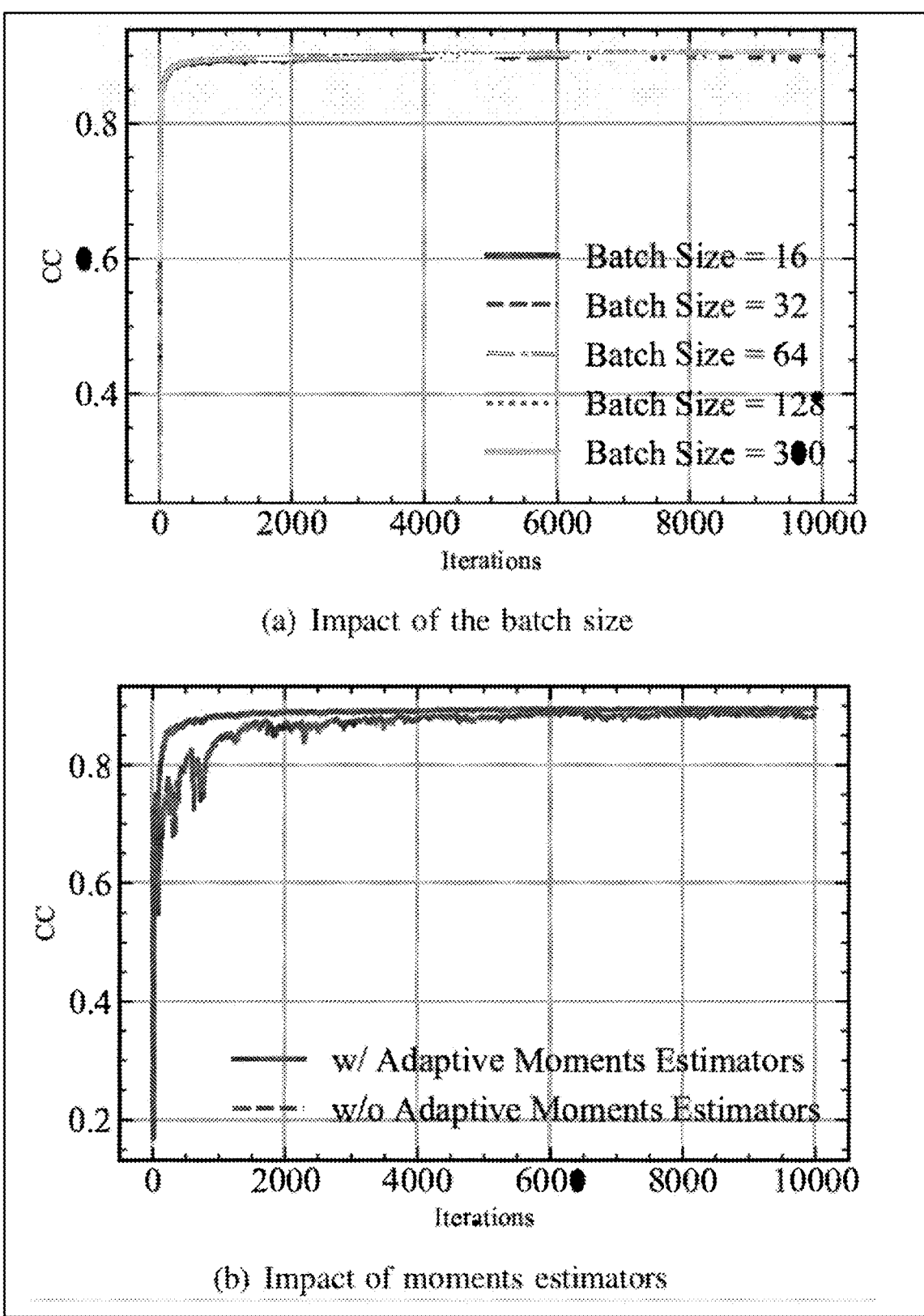
Figure 8:
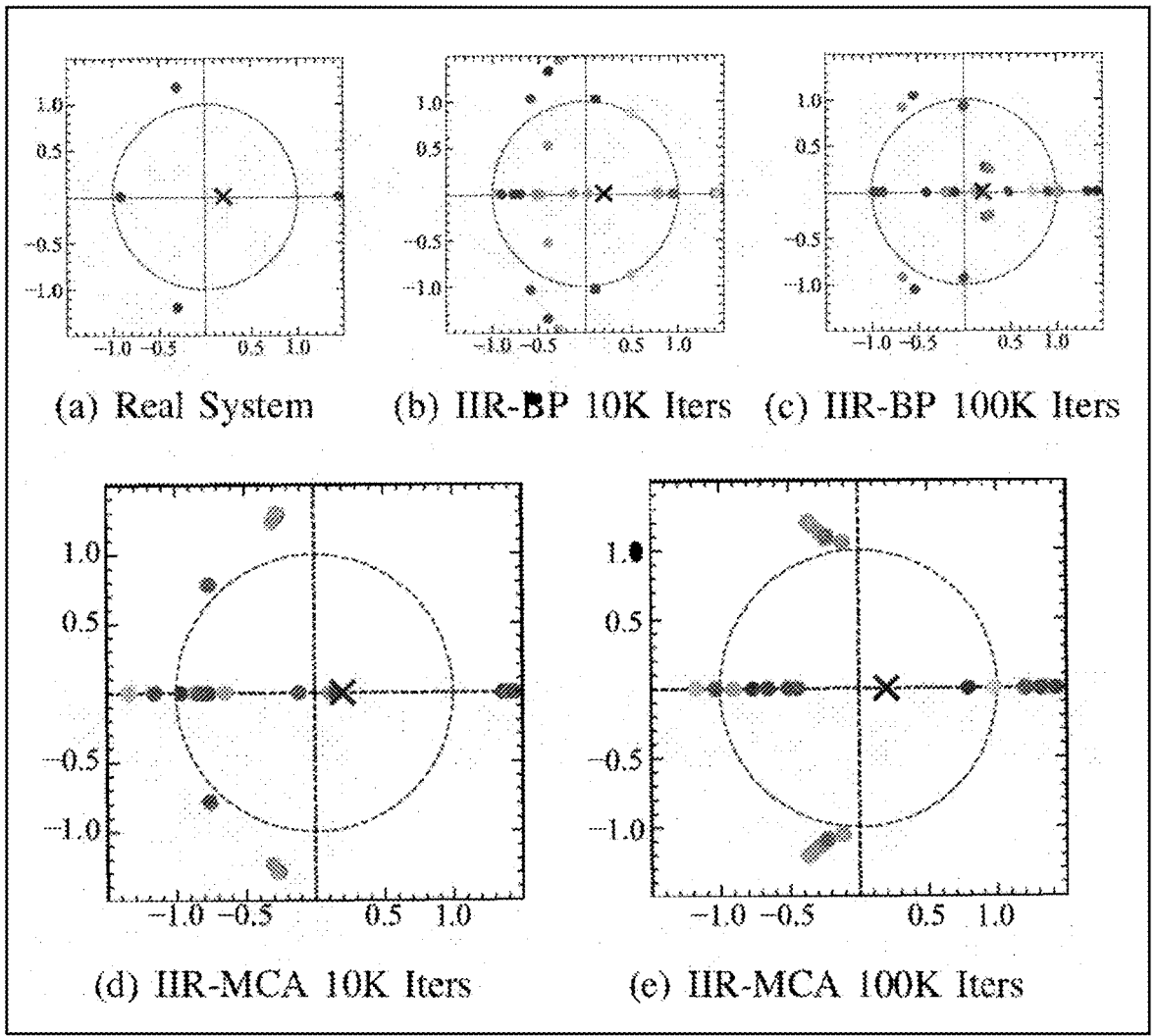

FIGS. 6, 7, and 8 provide results from example studies demonstrating improved efficiency, robustness, and convergence of an example modularized configuration process for a DNN machine learning model, in accordance with an embodiment of the present disclosure.

DETAILED DESCRIPTION OF SOME EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. GENERAL OVERVIEW AND EXEMPLARY TECHNICAL ADVANTAGES

Generally, an example learning framework includes at least three components: a mapper $f(x; w)$ parameterized by w that transforms an input into an output, a training process for optimizing parameters of the mapper (e.g., parameters w of mapper $f$), and a cost function $L(e)$ based at least in part on a measure of an error e for evaluation of the performance of the mapper with respect to a desired output or target signal. Thus, it may be understood that the mapper is a system that receives an input and provides an output based at least in part on the input, and the cost function compares the model output with the desired or target signal. The training algorithm then optimizes the parameters of the mapper by finding the optimal value of the cost function $L(e)$. In many examples, this optimal value corresponds to the minimal value of the error e of the chosen criterion.

An example of such a machine learning framework (referred herein interchangeably as a configuration framework or process, training framework or process, and/or the like generally) is illustrated in FIG. 1. Specifically, FIG. 1 illustrates a learning framework 100 in accordance with one embodiment that includes a mapper 110, a training process or learning algorithm 120, and a cost function 130. In some embodiments, the mapper 110 may be a linear model and an orthogonal projection of the desired response (e.g., the target signal $d_n$) in the space defined by the input signal $x_n$. In doing so, the cost function 130 may determine and use a mean-square error (MSE) between the mapper output $y_n$ and the target signal $d_n$ as a cost, considering that the Gaussian error residual's assumption can be invoked (e.g., the law of large numbers). For example, as understood by those of skill in the field of the present disclosure, this may be implemented as the Wiener solution for configuring the mapper 110.

However, as shown in the illustrated embodiment, the mapper 110 may be a non-linear structure, such as a deep neural network (DNN) machine learning model, or may otherwise comprise a non-linear model. As used herein, a DNN machine learning model may be a neural network model, an artificial neural network, a multi-layer perceptron (MLP), and/or the like. In particular, the illustrated embodiment describes a time-delay neural network (TDNN) machine learning model, which may be understood as a special configuration of a DNN machine learning model. DNN machine learning models are trained using backpropagation (BP) with the cost function 130 involving MSE. As should be understood, BP is capable of training DNN machine learning models from samples (e.g., an input signal sample and a target signal sample) using gradient descent. As described in the illustrated embodiment, all of the parameters in the mapper 110 (e.g., a DNN machine learning model) are trained by BP simultaneously. In the illustrated embodiment, the mapper 110 includes three internal nonlinear units that are single-input-multiple-output (SIMO) that are cascaded with a three-input-two-output linear layer, with the target signal $d_n$ being two-dimensional while the input signal $x_n$ is one-dimensional. The blocks labelled G(z) within the DNN machine learning model represent delays, which are implemented to generate, construct, and/or similar words used herein interchangeably the TDNN machine learning model.

However, training of DNN machine learning models using backpropagation includes various technical challenges. First, backpropagation requires end-to-end training of all layers of a DNN machine learning model simultaneously. Backpropagation first requires determining the error (e.g., the MSE) between the output of the DNN machine learning model and the desired response, and then subsequently propagating the error back to all layers. Second, optimization of the DNN machine learning model using backpropagation and MSE is non-convex with no theoretical guarantees of optimality, thereby causing slow convergence and requiring deliberate tweaking of hyperparameters. Third, each unit of the DNN machine learning model only receives gradient information passed from a top layer in an update, so control and understanding of internal representations are rather difficult. That is, backpropagation creates a "black box" that resists explainability of a DNN machine learning model or a mapping function generally.

As a fourth example technical challenge involved in backpropagation, formation of error at the output of the DNN machine learning model creates spurious correlations during training because of the high dimensional projection spaces created internally with hidden layers to project the input signal down to the dimensionality dictated by the desired response (three of such hidden layers are shown in the illustrated example of FIG. 1; however, other examples may implement at least hundreds of such hidden layers). Fifth, the error distribution given by MSE has a significantly long tail far from the normal distribution, and as a result, MSE may not quantify statistics of the error appropriately and may become a poor proxy for optimality. Alternatives to MSE may exist in information-theoretic quantities, such as marginal and joint probability distribution functions, that maximize mutual information between model output and desired response and/or that minimize a quantity of statistical divergence between the same. However, such alternatives are computationally inefficient especially in higher dimensions and are highly dependent on hyperparameters, which has direct impacts and requires cross-validation. Further, these alternatives may not guarantee consistency and accuracy when a limited number of samples (e.g., the given input signals and the given target signals) are available, in some examples.

As such, alternatives and technical improvements to the learning framework 100 in FIG. 1 for DNN machine learning models are a recognized need in the field to specifically improve upon at least the described technical challenges (in particular, technical challenges relating to end-to-end training and use of MSE in the cost function 130). In various embodiments, the modularized configuration framework modularizes the end-to-end training on an individual basis for each layer of a DNN machine learning model. FIG. 2 illustrates an example embodiment of such a modularized configuration framework, which may also be understood and referred to interchangeably as a layer-wise training process for DNN machine learning models, in some examples.

Generally, the DNN machine learning model comprises one or more hidden layers and an output layer. To describe the role of a hidden layer in a DNN machine learning model, the internal activations in each hidden layer of the DNN machine learning model can be understood as a vector of bases specifying a projection space for a subsequent or following layer. This in particular highlights the technical challenge of end-to-end training of all layers simultaneously, in which the combination of projection spaces is theoretically intractable and optimality is highly non-convex and non-guaranteed.

Thus, in various embodiments, configuration or training of the DNN machine learning model is modularized, and each layer of the DNN machine learning model is trained individually and in sequence from the input to explicitly approximate the same desired response d(n) at each layer in a modularized manner. After a layer (or weights thereof) is individually configured and the associated projection space is adapted, the resulting configuration of the layer (e.g., the weights) is frozen or fixed before proceeding to configure a subsequent layer. For example, the training of a second hidden layer preferably starts after the training or configuration of a first hidden layer has completed, in various embodiments. In various examples, the second hidden layer may receive as inputs the outputs of the previous layer alone or extended with the original input signal. The second hidden layer configuration may then comprise finding the optimal parameters that best approximates the same target signal d(n). The process is repeated until the last hidden layer. Finally, in various embodiments, the output layer (also referred as the final layer) projects the desired response to the last projection space created by the last hidden layer using least squares techniques. Various embodiments enable extraction of sufficient and maximum information from a desired response or target signal in order to determine the appropriate projections or projection spaces for each layer of the DNN machine learning model, thereby enabling modularized configuration of the DNN machine learning model.

In various embodiments, some hidden layers of a DNN machine learning model may have dimensionality that does not substantially match that of a desired response or target signal d(n), and thus, MSE cannot be adopted for the modularized configuration of a DNN machine learning model to train the internal layers. Thus, in various embodiments, a first cost function 130A of the modularized configuration process or framework in accordance with various embodiments described herein involves the determination of correlation measures as an alternative to or in addition to MSE while further involving another cost function 130B with the least squares technique in training the output layer and the final projection space, as illustrated in FIG. 2.

In various embodiments, the determined correlation measures are based at least in part on maximal correlation concepts, and specifically may be based at least in part on the correlation ratio. Generally, maximal correlation concepts relate to ideal measurements of the strength of statistical dependence between two random variables (or random vectors), for example, an input signal $\xi$ (or projection thereof) and a target signal $\eta$. The maximal correlation concepts seek to find the maximal correlation coefficient between $f(\xi)$ and $g(\eta)$ by applying any two feasible Borel-measurable functions $f(\bullet)$ and $g(\bullet)$ to the random variables, in some examples. According to maximal correlation concepts, strict statistical dependence between $\xi$ and $\eta$ can be correctly characterized even if the relation between $\xi$ and $\eta$ is nonlinear. Thus, maximal correlation concepts contrast with the typical correlation coefficient through which only linear relations between $\xi$ and $\eta$ can be captured. Typically, difficulties in applying maximal correlation concepts lie in solving or selecting $f(\bullet)$ and $g(\bullet)$ over all feasible Borel-measurable functions. However, maximal correlation concepts can be uniquely applied for configuration or training of a DNN machine learning model, as the DNN machine learning model (e.g., as illustrated in FIG. 2) implements functions $f(\bullet)$ during the training.

Additionally, maximal correlation concepts allows a correlation ratio, which does not use $g(\bullet)$ and works directly with $\{f(\xi), \eta\}$ in the pair of random variables (e.g., the "correlation pair"). The need for an arbitrary $g(\bullet)$ may be precluded, in various examples. As such, the maximal correlation value as determined in various embodiments described herein may be between $f(x)$ and d, with x representing the input signal and d representing the target signal. The correlation ratio between $f(x)$ and d may characterize the nonlinear relationship between x and d and may reach a maximum value (e.g., 1) when the two random variables are strictly dependent.

Thus, use of the correlation ratio in the first cost function 130A provides various technical advantages over other potential correlation-based measures when used in modularized configuration of DNN machine learning models, as will be discussed in detail below in the present disclosure. Generally, other correlation-based measures such as the Pearson correlation coefficient are unsuitable for characterizing nonlinear dependence between two random variables or vectors. Specifically, correlation coefficients may vanish when dependence between two random variables or vectors is characterized nonlinear, and correlation coefficients may be restrictive in only achieving their maximum value if there is a linear relationship between the two random variables or vectors. As such, the correlation ratio is better suited to characterize nonlinear dependences between two random variables or vectors, such as an input signal (e.g., or response thereof) and a target signal), as will be discussed below in the present disclosure.

Further, the correlation ratio provides other technical advantages when used in modularized configuration of DNN machine learning models compared to maximal correlation. Maximal correlation generally involves selection and application of two Borel-measurable functions to the two random variables or vectors and may be used to characterize nonlinear dependence. However, it may be computationally and time intensive to search for the two Borel-measurable functions within a space of functions in order to apply to both random variables or vectors. However, the correlation ratio provides an adaptation of maximal correlation that uniquely reduces such limitations. As discussed, the correlation ratio involves application of a Borel-measurable function to only one of the two random variables or vectors. When the correlation ratio is used in modularized configuration of DNN machine learning models, the structure of the DNN machine learning model is used as the support for the search of the space of functions for the Borel-measurable to apply. Thus, use of the correlation ratio in modularized configuration of DNN machine learning models is technically advantageous over other potential correlation-based measures in terms of accurately characterizing nonlinear dependence as well as being efficient and feasible to compute (by only requiring one measurable function instead of two).

It may be recognized by those of skill in the field of the present disclosure that the correlation ratio is related to nonlinear least squares techniques. Accordingly, given that $f(\bullet)$ is approximated by a fixed class of functions given by a DNN machine learning model's structure, various embodiments involve approximation of the function $f(\bullet)$ that gives the maximal correlation coefficient between $f(x)$ and d. That is, the structure of the DNN machine learning model can be optimally used to search through a space of functions for $f(\bullet)$. In some examples, the space of functions is a reproducing kernel Hilbert space (RKHS), and the function $f(\bullet)$ is found within the RKHS.

Thus, the use of maximal correlation concepts that is directed to quantifying and directly manipulating the statistical dependence between an input signal x and a desired response d unifies the nonlinearity of the DNN machine learning model and the cost function under the same learning system principle. Compared with the aforementioned information-theoretic approaches, various embodiments tremendously simplify the estimation and optimization process by utilizing only second-order statistics between the functionals while still exploiting higher-order information by searching for the optimal measurable function with a DNN machine learning model. Correlation is understood in the space of random variables (or random vectors) and realizations thereof; that is, estimating properties of correlation are immediately available, such as measures of association. For at least these reasons, use of maximal correlation concepts enables modularized configuration of DNN machine learning models (e.g., for regression tasks and time series modeling tasks) that departs from adaptation of parameters for the orthogonality of projection error. Further, the explicit design of projection spaces is emphasized. In various embodiments, the construction of an error signal is skipped, while still capturing the full statistical dependence between the model output and the target signal.

FIG. 2 provides a diagram illustrating an overview of a modularized configuration or layer-wise training framework 200 for a DNN machine learning model in accordance with various embodiments of the present disclosure. In the illustrated embodiment, the DNN machine learning model may be implemented for a SIMO application. In various embodiments, the layer-wise training framework 200 involves maximal correlation concepts. As shown in FIG. 2, the layer-wise training framework splits a mapper 110 into a nonlinear-model-based representation 212 for each hidden layer and cascaded with a linear projector 214. Various operations can be repeated for any number of hidden layers. Alternatively, a quadratic mutual information (QMI) cost function can be utilized in some examples, but the complexity of computation is much higher and the robustness of the training is poor.

When the mapper 110 does not include the delay operator G(z), it corresponds to the hidden layer of a multi-layer perceptron (MLP), and therefore, various embodiments describing the layer-wise training framework 200 provide an improvement to other training processes of different static neural networks, such as MLPs and convolutional neural networks (CNNs) of any depth.

In contrast with the learning framework 100, the modularized configuration framework 200 does not restrict the internal dimensions of the DNN machine learning model to the output dimension of the target signal, and the modularized configuration framework does not require an error signal until the final projection or output layer. As illustrated, the training of the DNN machine learning model is modularized into at least two parts, in various embodiments. In a first part, the hidden layers of the DNN machine learning model are configured according to maximal correlation concepts (e.g., the correlation ratio) using available target signals, and the resulting configuration of each hidden layer is frozen or fixed before proceeding to configure a subsequent hidden layer. Upon configuration of the hidden layers, the outputs are projected to the space dictated by the cardinality of the target signals by using least-squares techniques. This modularization, or the decoupling of the dimensionality of the hidden layers and the target signals, is enabled based at least in part on correlation being a pairwise measure, such that a cost can be defined as a sum of multiple correlation pairs of a single unit output and one of the available target signals.

In various embodiments, the internal mapping of a DNN machine learning model and/or a layer thereof (e.g., $f(\bullet)$) may be approximated with a parametric mapping function, and in some examples, the parametric mapping function is chosen to be a class of models referred herein as a Bank of Wiener Models, or a BWM. A Wiener model may comprise a linear filter followed by a static memoryless nonlinear function, or a myopic function with infinitely decaying memory. Generally, the term "Wiener model" may refer to a model belonging to a class of block-oriented nonlinear models called Hammerstein-Wiener models and may include a linear time-invariant block (LTI) followed by a static nonlinear block. A Wiener model may be only parameterized by a set of weights in the LTI block despite creating a nonlinear time-invariant system.

A DNN machine learning model may comprise a plurality of Wiener models to form a multiple-input multiple-output system (e.g., a MIMO system) or a multiple-input single-output system MISO), and the training of such systems is possible with the described framework of FIG. 2. Specifically in various embodiments described herein, BWMs are used to approximate $f(\bullet)$ in the context of determining correlation ratios to measure statistical dependence (in spite of only estimating the correlation between $f(\bullet)$ and a target signal). It will be appreciated that BWMs are described herein as nonlinear-model-based representations 212 of the internal mappings or hidden layers of a DNN machine learning model, in various example embodiments; however, other models may be adequately used to implement and/or represent hidden layers of a DNN machine learning model.

Generally, use of a BWM to approximate $f(\bullet)$ of a particular hidden layer to determine a correlation ratio for use in configuring the particular hidden layer may be referred to herein as a correlation-based configuration process or a Maximal Correlation Algorithm (MCA) as referred to interchangeably herein. As illustrated in FIG. 2, the correlation-based configuration process, or MCA, is implemented in a first cost function 130A for configuring nonlinear-model-based representations 212 of hidden layers of the DNN machine learning model, while the parameters of the linear projector 214 are configured by computing the least squares solution to find the minimum MSE. In various embodiments, the configuration of the mapper 212 may be chosen to be a SIMO system or a MIMO system depending on the dimensionality of the target signal. The illustrated embodiments specifically provides the configuration for a single-hidden-layer DNN machine learning model. The correlation-based configuration process may be adopted with various layer cascading techniques in order to configure a multi-layer DNN machine learning model, as will be discussed in the context of FIG. 4 below.

II. COMPUTER PROGRAM PRODUCTS, SYSTEMS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY COMPUTING ENTITY

FIG. 3 provides a schematic of an exemplary computing entity 300 that may be used in accordance with various embodiments of the present disclosure. For instance, the computing entity 300 may be a device configured to store, manage, implement, operate, and/or the like a DNN machine learning model, and in particular, the computing entity 300 may be configured to efficiently and effectively train the DNN machine learning model for one or more particular tasks in accordance with the modularized configuration framework 200. That is, in various embodiments, the computing entity 300 may perform various example operations to determine nonlinear-model-based representations (e.g., BWMs) of hidden layers of a DNN machine learning model, determine correlation ratios, individually and sequentially configure hidden layers of a DNN machine learning model using the correlation ratios in a correlation-based configuration process, use the DNN machine learning model to automatically perform trained tasks and/or the like.

In general, the terms computing entity, entity, device, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the field should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 320 for communicating with various computing entities, such as by communicating data, content, information, and/or similar terms used herein interchangeably that can be transmitted, received, operated on, processed, displayed, stored, and/or the like. Thus, in certain embodiments, the computing entity 300 may be configured to receive data from one or more data sources and/or devices as well as receive data indicative of input, for example, from a device. For example, the computing entity 300 may receive, via a communications interface 320, a plurality of training samples each including an input signal and at least one desired response or target signal, the training samples to be used in configuring a DNN machine learning model in accordance with the modularized configuration framework 200.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 305 (also referred to as processors, processing circuitry, and/or similar terms used herein interchangeably) that communicate with other elements within the computing entity 300 via a bus, for example, or network connection. As will be understood, the processing element 305 may be embodied in several different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 305 may be configured for a particular use or configured to execute instructions stored in volatile or non-volatile media or otherwise accessible to the processing element 305. As such, whether configured by hardware, computer program products, or a combination thereof, the processing element 305 may be capable of performing steps or operations according to embodiments of the present disclosure when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or non-volatile memory media 310 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or non-volatile memory media 310 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the non-volatile memory media 310 may also be embodied as a data storage device or devices, as a separate database server or servers, or as a combination of data storage devices and separate database servers. Further, in some embodiments, the non-volatile memory media 310 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or volatile memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In particular, volatile storage or volatile memory media 315 of the computing entity 300 includes the cache or cache memory, which may be exploited in unauthorized memory access cyberattacks to reveal information stored in private, concealed, restricted, and/or the like portions of the non-volatile storage or non-volatile memory media 310.

As will be recognized, the volatile storage or volatile memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 305. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 305 and operating system.

As will be appreciated, one or more of the computing entity's components may be located remotely from other computing entity components, such as in a distributed system. Furthermore, one or more of the components may be aggregated, and additional components performing functions described herein may be included in the computing entity 300. Thus, the computing entity 300 can be adapted to accommodate a variety of needs and circumstances.

IV. EXEMPLARY OPERATIONS

As previously discussed, various embodiments of the present disclosure provide a modularized configuration framework 200 for training a DNN machine learning model. The modularized configuration framework 200 enables training of a DNN machine learning model with training samples (e.g., in a supervised learning manner) with improved computational efficiency and reduced computational complexity, as well as improved optimality and improved explainability among other various technical advantages. Various embodiments involve individual, independent, and sequential configuration or training of hidden layers of the DNN machine learning model and additionally separate configuration of a final projection layer. In various embodiments, the MCA cost function 130A may be used to configured individual hidden layers 212, while the MSE cost function 130B (e.g., least squares techniques) may be used to configure the linear projector 214. Specifically, the hidden layers are configured based at least in part on determination of correlation or correlation-based measures, while the final projection layer is configured based at least in part on MSE, in various embodiments.

Thus, various embodiments of the present disclosure provide various technical advantages. For one, modularization of model training enables efficient allocation and use of computational resources. Further, the modularized configuration framework 200 has a pseudo-convex nature, and as a result, the model training requires less overall training time until convergence of the DNN machine learning model. Due to the modularization, various embodiments provide improved explainability and easier selection of neural network and training parameters, which leads to less overall manual and computational effort for excess modifications.

In various embodiments, as previously discussed, an individual hidden layer and/or module of the DNN machine learning model is configured based at least in part on determining a correlation measure between the individual hidden layer's output and the target signal. It may be appreciated that the individual hidden layer's output may be in response to the input signal and/or in response to the output(s) of one or more previous or preceding hidden layers. Various embodiments may adapt various cascading techniques to efficiently exploit the precedingly configured hidden layers during the configuration of a given hidden layer. Thus, in various embodiments, the computing entity 300 is configured to determine a correlation measure between a hidden layer's output and a target signal. For example, the computing entity 300 comprises means, such as processing element 305, memories 310, 315, and/or the like, for determining a correlation measure for each individual hidden layer of a DNN machine learning model.

According to one embodiment of the present disclosure, the correlation measure is determined based at least in part on a correlation coefficient that is understood by those of skill in the field of the present disclosure (e.g., a Pearson correlation coefficient). Generally, given two random variables $\xi \in \mathbb{R}$ and $\eta \in \mathbb{R}$, the correlation coefficient between $\xi$ and $\eta$ may be determined using Equation 1.

$$R(\xi, \eta) = \frac{M(\xi \cdot \eta) - M(\xi)M(\eta)}{D(\xi)D(\eta)} \qquad \text{Equation 1}$$

In Equation 1, $M(\xi)$ represents the first moment $\mathbb{E}[\xi]$ of any given random variable $\xi : \Omega \to \mathbb{R}$ and $D(\xi)$ represents the square root of its second moment (e.g., $D(\xi) = \sqrt{E[\xi^2] - E[\xi^2]}$). While $R(\xi, \eta)$ may be used to characterize strength of statistical dependence between $\xi$ and $\eta$, $R(\xi, \eta)$ may vanish even in instances in which $\xi$ and $\eta$ are strictly dependent, especially as such dependence is characterized nonlinearly. Precisely, $R(\xi, \eta)$ or the correlation measure may achieve its maximum value (e.g., 1) if and only if there is a linear relation between $\xi$ and $\eta$. As such, the correlation coefficient may be suitable as the correlation measure for linear mappers, models, or layers thereof.

However, as previously described, use of maximal correlation concepts may be more suitable for nonlinear mappers and DNN machine learning models. According to another embodiment of the present disclosure, the correlation measure determined based at least in part on a maximal correlation between two random variables or vectors. Again, in the context of the configuring and training individual hidden layers of a DNN machine learning model, the two random variables may be an output of an individual hidden layer and a target signal. Maximal correlation generally involves selecting and applying two measurable functions $f: \mathbb{R} \rightarrow \mathbb{R}$ and g: $\mathbb{R} \rightarrow \mathbb{R}$ such that $R(f(\xi), g(\eta))$ is maximized. Accordingly, the maximal correlation between two random variables $\xi$ and $\eta$ may be determined using Equation 2. In example instances in which there exists two Borel-measurable functions $f(\cdot)$ and $g(\cdot)$ that can be selected such that the relation $f(\xi)=g(\eta)$ can be obtained, $S(\xi, \eta)$ or the correlation measure may achieve its maximum value (e.g., 1), even as the dependence between $\xi$ and $\eta$ is nonlinear.

$$S(\xi, \eta) = \sup_{f,g} R(f(\xi), g(\eta)) \qquad \text{Equation 2}$$

An equivalent form of the maximal correlation between two random variables may be obtained using $\mathcal{H}_\xi$ as the space of all random variables with the form $f(\xi)$ that satisfy the moments constraints of $M(f(\xi))=0$ and $D(f(\xi))=1$. It will be understood that $\mathcal{H}_\xi$ is not an empty set, as $\mathcal{H}_\xi$ includes at least the linear transformation $$l(\xi) = \frac{\xi - M(\xi)}{D(\xi)}.$$

Thus, the equivalent form of the maximal correlation between two random variables according to one embodiment is provided in Equation 3.

$$S(\xi, \eta) = \sup_{f(\xi) \in \mathcal{H}_\xi, g(\eta) \in \mathcal{H}_\eta} M(f(\xi) \cdot g(\eta)) \qquad \text{Equation 3}$$

According to yet another embodiment of the present disclosure, the correlation measure is and/or is based at least in part on a correlation ratio between the two random variables. The correlation ratio generally involves less computational complexity by requiring only one measurable function $f$.

The correlation ratio between two random variables can be determined or obtained based at least in part on the maximal correlation between the two random variables and given $M(\xi|\eta)$ representing the conditional mean of $\xi$ given $\eta$. Using the conditional mean, the maximal correlation $S(\xi, \eta)$ can be obtained using the two fixed-point equations provided by Equations 4 and 5 respectively. In another embodiment of the present disclosure, the value of $S(\xi, \eta)$ may be the largest eigenvalue of the function $Af=M(M(f(\xi)|\eta)|\xi)$, and the optimal $f(\cdot)$ may be the corresponding eigenfunction.

$$M(M(f(\xi)|\eta)|\xi) = S^2(\xi, \eta)f(\xi) \qquad \text{Equation 4}$$

$$M(M(g(\eta)|\xi)|\eta) = S^2(\xi, \eta)g(\eta) \qquad \text{Equation 5}$$

As shown from the two fixed-point equations and the eigenvalue approach, the maximal correlation between two random variables is formed in two conditional mean determinations (e.g., to determine $M(M(f(\xi)|\eta)|\xi)$, the conditional mean of $f(\xi)$ with respect to $\eta$ is first determined, followed by determining the conditional mean of $M(f(\xi)|\eta)$ with respect to $\xi$. Each of these steps may be based at least in part on a single maximation provided by Equation 6. Equation 6 may be equivalent to Equation 7 with the assumption that $M(\eta)=0$ and $D(\eta)=1$.

$$\Theta_\xi(\eta) = \sup_f R(f(\xi), \eta) \qquad \text{Equation 6}$$

$$\Theta_\xi(\eta) = \sup_{f(\xi) \in \mathcal{H}_\xi} M(f(\xi) \cdot \eta) \qquad \text{Equation 7}$$

Equation 6 and Equation 7 each describes determination of a correlation ratio $\Theta$ between the two random variables $\xi$ and $\eta$, and the correlation measure used for configuring an individual hidden layer is determined based at least in part on this correlation ratio $\Theta$, in various embodiments. As shown, the correlation ratio involves a maximization over only one measurable function $f$ and may be equivalent to the maximal correlation $S(\xi, \eta)$ when optimally $g(\eta)=\eta$. As understood, the correlation ratio $\Theta$ has its maximum value (e.g., 1) whenever the two random variables are strictly dependent regardless of whether such dependence is nonlinear, as preferred for the general correlation measure. Thus, the correlation ratio is suitable and capable for use in configuring and training a DNN machine learning model, which involves a direct mapping from a first random variable $\xi$ (e.g., the input signal and/or the outputs from already-configured and preceding hidden layers) to an estimation $\hat{\eta}$ of another random variable $\eta$ (e.g., the target signal).

In particular, selecting the correlation ratio over maximal correlation provides technical advantages including improved computational efficiency and applicability, as a second measurable function g is not needed for the correlation ratio. It may be appreciated that the correlation ratio may be a special case of the maximal correlation in which the second measurable function is simply chosen as $g(\eta)=\eta$, and then a projection space can be directly found with $\hat{\eta}=f(\cdot)$. In some example embodiments, the correlation measure may be selected to be the correlation ratio and/or the maximal correlation based at least in part on the structure of the DNN machine learning model, the dimensionality of input signals and target signals, and/or the like. In some example embodiments, a correlation measure used to configure a particular individual hidden layer of the DNN machine learning model may be a correlation ratio while a correlation measure used to configure a different individual hidden layer of the DNN machine learning model may be a maximal correlation. That is, in some examples, correlation measures (e.g., the correlation ratio and the maximal correlation) for individually configuring the hidden layers of the DNN machine learning model are heterogenous.

In various embodiments, the correlation ratio is preferably used as the correlation measure within the modularized configuration framework 200 due at least two significant properties. First, if the function $f$ is optimized over any and all Borel-measurable functions, the optimal solution off matches the conditional mean $$f^*(\xi) = \frac{M(\eta|\xi)}{D(M(\eta|\xi))}.$$

That is, the DNN machine learning model may approximate the closed-form solution since the DNN machine learning model is proven to be universal, in another example embodiment. Second, Equation 6 for determining the correlation ratio is scale-invariant with respect to $f(\xi)$ and $\eta$, which implies that the optimal $f$ is given by a family of functions parameterized by a scaling factor.

This can be proved through Lemma 1, which states that the equality $\Theta_\xi(\xi, \eta) = R(f^*(\xi), \eta)$ holds for the function $$f^*(\xi) = \frac{M(\eta|\xi)}{D(M(\eta|\xi))}$$

Then, for any function $f$ such that $f(\xi) \in \mathcal{H}_\xi$, $R(f(\xi), \eta) = M(f(\xi) \cdot \eta) = M(f(\xi) \cdot M(\eta|\xi))$. By the Cauchy-Schwarz inequality, $M(f(\bullet) \cdot M(\eta|\xi)) \leq D(M(\eta|\xi))$. This holds if and only if $$f(\xi) = f^*(\xi) = \frac{M(\eta|\xi)}{D(M(\eta|\xi))}.$$

Furthermore, the correlation ratio is obtained as $\Theta_\xi(\xi, \eta) = D(M(\eta|\xi))$.

To add a further corollary to this proof, $\mathcal{F}_\alpha$ can represent a parametric family of functions parameterized by a scaling factor $\alpha$ and can be defined by Equation 8.

$$\mathcal{F}_\alpha^* = \{\alpha f^*: \alpha \in (0, +\infty)\} \qquad \text{Equation 8}$$

It follows that every function $$f \in \mathcal{F}_\alpha^*$$

is a valid function such that the equality $\Theta_\xi(\xi, \eta) = R(f^*(\xi), \eta)$ holds. This corollary may demonstrate a significant property of the correlation ratio, being that functions defined by the maximum value belong to a class of functions parameterized by a scaling factor (e.g., $\alpha$), which may enable the correlation ratio to be efficiently used and uniquely adaptable for configuring and training hidden layers of a DNN machine learning model compared to other example frameworks. Further, the correlation ratio may enable the modularized configuration framework 200 to be applied for system identification tasks as will be described within the present disclosure. Therefore, in various embodiments, the correlation ratio is used as a correlation measure by which individual hidden layers of a DNN machine learning model are configured in a modularized manner.

Therefore, various embodiments may involve determining a correlation measure based at least in part on a hidden layer's response to an input signal (and/or the outputs of previously configured layers in response to the input signal) and a target signal, precisely a correlation ratio between a layer output represented by $f(x)$ and a target signal output d. For determination of the correlation ratio then, $f$ is approximated by a nonlinear-model-based representation selected to represent or characterize the mapping or action of the hidden layer, and in various embodiments, the nonlinear-model-based representation may be a BWM. In various embodiments, each hidden layer of the DNN machine learning model provides an approximation to one element in the parametric family of $f$. Such an approximation may increase in precision as more layers are trained and cascaded into the DNN machine learning model until reaching the optimal function (e.g., the conditional mean) within the acceptable margin of error.

In various embodiments, the nonlinear-model-based representation of a particular hidden layer provides the projection space for the next layer's operation (e.g., the approximation performed by a layer subsequent to the particular hidden layer).

In various embodiments, a nonlinear-model-based representation for a particular hidden layer implements the projection space for the next layer operation (e.g., the mapping performed by a layer subsequent to the particular hidden layer). In various embodiments, a nonlinear-model-based representation for a particular hidden layer comprises a configurable number of model components (equivalently units of a DNN machine learning model), and the output of each model component (e.g., a Wiener model) of the nonlinear-model-based representation represents an adaptive basis. In some example embodiments, a model component (e.g., a Wiener model) of a nonlinear-model-based representation (e.g., a BWM) comprises a linear dynamic block followed by a static nonlinear block. In various embodiments, the linear dynamic block of a model component (e.g., a Wiener model) may specifically be and/or be represented as a FIR filter. In some example embodiments, the linear dynamic block of a model component may be an IIR filter or a special class thereof. In various embodiments, the static nonlinear block of a model component may be a sigmoid nonlinearity.

In various embodiments, a nonlinear-model-based representation is a multiple-output system (e.g., a BWM). This may be demonstrated with two positive integers K and L, where K describes the number of model components in the nonlinear-model-based representation (and the dimension of the projection space of the corresponding hidden layer), and L describes the order of each model component (e.g., Wiener model) in the nonlinear-model-based representation. Given any $k \in \{1, 2, \ldots, K\}$, the output may be described as $$h(x, k) = \phi(w_k^T x + b_k),$$

which is parameterized by $\theta_k = \{W_k, b_k\}$ with $w_k \in \mathbb{R}^L$ and $b_k \in \mathbb{R}$. It may then be appreciated that each h(x, k) is an element of the family of functions described by Equation 9, demonstrating that the nonlinear-model-based representation is a multiple-output system.

$$\mathcal{H}_\theta = \{w^\top x + b: \theta \in \{(w, b) \mid w \in \mathbb{R}^L, b \in \mathbb{R}\}\} \qquad \text{Equation 9}$$

In various embodiments, the modularized configuration framework 200 involves identifying a nonlinear-model-based representation for a hidden layer of the DNN machine learning model and training it with available target signals and the determined correlation measure, which specifically may be based at least in part on a correlation ratio.

In various embodiments, a nonlinear-model-based representation may be trained using single-dimensional target signals and/or using multi-dimensional target signals. As previously described, the use of a correlation ratio derived from pairwise interactions as the correlation measure in configuring or training a nonlinear-model-based representation of a hidden layer advantageously enables training of a K-dimensional nonlinear-model-based representation with a multi-dimensional target signal.

Therefore, through identification of a nonlinear-model-based representation with output h(x, k) in response to an input signal x and determination of a correlation measure as a correlation ratio between the output of the nonlinear-model-based representation and a target signal d, the hidden layer can be configured based at least in part on receiving training samples each including input signals and target signals. In the present disclosure, the samples $X=\{x_1, x_2, \ldots, x_N\}$ may be received (e.g., by computing entity 300), and each input signal $x_n=[x_{n,1}, x_{n,2}, \ldots, x_{n,L}]$ is an L-dimensional vector, in some example embodiments. In various embodiments, the target signals may be scalar-valued, one-dimensional, single-dimensional, and/or the like; that is, the desired mapping of the DNN machine learning model to be configured using the modularized configuration framework 200 is a L-to-1 dimensional mapping. Thus, in some examples, the samples X comprise and/or are associated with scalar-valued targets $D=\{d_1, d_2, \ldots, d_N\}$, each $d_n$ corresponding to an input signal $x_n$ and each $d_n \in D$ is in $\mathbb{R}$. The target signal can be represented as a vector $d=[d_1, d_2, \ldots, d_N]^T$.

To then configure a hidden layer of the DNN machine learning model, Equation 6 may be used as the first cost function 130A (as illustrated in FIG. 2), given a model output y. $\tilde{M}$, $\tilde{D}$, and $\tilde{R}$ may be used in the present disclosure to describe empirical estimates of corresponding quantities in Equation 6. For configuration or training of the DNN machine learning model, R(y, d) as the first cost function 130A should be maximized over the parameters across layers of the DNN machine learning model. Using observations provided in Equations 10 and 11, this maximization of a correlation measure as the first cost function 130A can be described in Equation 12.

$$\sum_{k=1}^{K} M(h(x, k) \cdot d) = M\left(\sum_{k=1}^{K} (h(x, k) \cdot d)\right) \quad \text{Equation 10}$$

$$\sum_{k=1}^{K} M(h(x, k)) = M\left(\sum_{k=1}^{K} (h(x, k))\right) \quad \text{Equation 11}$$

$$\underset{\theta_1, \theta_2, \ldots, \theta_K}{\text{maximize}} \tilde{R}\left(y = \frac{1}{K}\sum_{k=1}^{K}[h(x_1, k), \ldots, h(x_n, k)]^T, d\right) \quad \text{Equation 12}$$

Without losing any generality, it may be assumed in various embodiments that the target signal d satisfies $\tilde{M}(d)=0$ and $\tilde{D}(d)=1$. These moments constraints may also be satisfied on the model side as $$\tilde{D}\left(\frac{y}{\tilde{D}(y)}\right) = 1.$$

The first moment of y may be satisfied by subtracting its empirical mean value. Therefore, the optimal value of the cost function 130 describe in Equation 12 is provided in Equation 13. That is, Equation 13 provides an approximation to the correlation ratio using a K-model nonlinear-model-based representation. In various embodiments, the optimization provided in Equation 13 may be involved in the correlation-based configuration process.

$$\Theta_X^{(K)}(X, D) = \max_{\theta_1, \theta_2, \ldots, \theta_K} \tilde{R}(y, d) \quad \text{Equation 13}$$

By the previous Lemma 1 and the presented corollary, the equality $$\Theta_x^{(K)}(x, d) = R(h^*(x), d)$$

holds for $$h^*(x) = \frac{M(d \mid x)}{D(M(d \mid x))}$$

and any function in the set $$\mathcal{H}_\alpha^* = \{\alpha h^* : \alpha \in (0, +\infty)\}.$$

In various embodiments, a nonlinear-model-based representation may be capable of approximating nearly perfectly at least one function that belongs to the set $$\mathcal{H}_\alpha^*$$

which is a unique feature of the correlation-based configuration process.

Equation 12 may be optimized through derivation of the gradient form. In various embodiments, the MCA may be implemented online and/or using mini-batches. Equation 14 provides the derivative of $\tilde{R}(y, d)$ with respect to the k-th weight vector, and Equations 15 and 16 provide explicit expansions of selected terms of Equation 14.

$$\frac{\partial \tilde{R}(y, d)}{\partial w_k} = \frac{1}{\tilde{D}(y)} \cdot \frac{\partial \tilde{M}(h(x, k) \cdot d)}{\partial w_k} - \frac{\tilde{M}(y \cdot d)}{2\tilde{D}^3(y)} \cdot \frac{\partial \tilde{M}(y \cdot y)}{\partial w_k} \quad \text{Equation 14}$$

$$\frac{\partial \tilde{M}(h(x, k) \cdot d)}{\partial w_k} = \frac{1}{N}\sum_{n=1}^{N} d_n \phi'(w_k^\top x_n + b_k) x_n \quad \text{Equation 15}$$

$$\frac{\partial \tilde{M}(y \cdot y)}{\partial w_k} = \frac{2}{N}\sum_{n=1}^{N}\sum_{k'=1}^{K} \phi(w_{k'}^\top x_n + b_{k'}) \phi'(w_k^\top x_n + b_k) x_n \quad \text{Equation 16}$$

Meanwhile, the derivative of $\tilde{R}(y, d)$ with respect to bias is provided in Equations 17-19.

$$\frac{\partial \tilde{R}(y, d)}{\partial b_k} = \frac{1}{\tilde{D}(y)} \cdot \frac{\partial \tilde{M}(h(x, k) \cdot d)}{\partial b_k} - \frac{\tilde{M}(y \cdot d)}{2\tilde{D}^3(y)} \cdot \frac{\partial \tilde{M}(y \cdot y)}{\partial b_k} \quad \text{Equation 17}$$

$$\frac{\partial \tilde{M}(h(x, k) \cdot d)}{\partial b_k} = \frac{1}{N}\sum_{n=1}^{N} d_n \phi'(w_k^\top x_n + b_k) \quad \text{Equation 18}$$

$$\frac{\partial \tilde{M}(y \cdot y)}{\partial b_k} = \frac{2}{N}\sum_{n=1}^{N}\sum_{k'=1}^{K} \phi(w_{k'}^\top x_n + b_{k'}) \phi'(w_k^\top x_n + b_k) \quad \text{Equation 19}$$

In various embodiments, these gradients may be easily approximated online or using mini-batches provided accurate estimations for $\tilde{D}(y)$, $\tilde{M}(y \cdot d)$, and $\tilde{M}(y)$. Further, the gradient in the first term of Equation 14 may be fully determined by the k-th models, and the second term may be easily computed by summing the partial derivative with respect to each model. The gradient direction can be interpreted as two terms: the first term is to improve the correlation $\tilde{M}(h(x, k) \cdot d)$ for each model and the second term is to enforce the second-moment constraint. This form implies that MCA achieves a special parallel structure.

In various embodiments, an adaptive procedure may be used to track the values of $\tilde{D}(y)$, $\tilde{M}(y \cdot d)$, and $\tilde{M}(y)$. The gradient can then be estimated on a sample-by-sample basis or using mini-batches of the training samples. In various embodiments, the adaptive procedure significantly improves computational efficiency and stabilizes the modularized configuration framework 200 by reducing variance with respect to the gradient. After configuration or training of the non-linear-model-based representation (using the first cost function 130A), the weights are frozen or fixed, and a least-squares technique using y as the input and d as the target is determined (e.g., for the second cost function 130B). The final DNN machine learning model structure, which is the concatenation of the nonlinear-model-based representation 212 for each hidden layer and the linear projector 214, can be used in the test set for prediction or regression, similar to a MLP machine learning model. Algorithm 1 below provides an example embodiment of the correlation-based configuration process or MCA—that is, the determination of correlation measures and configuration of a nonlinear-model-based representation.

---

Algorithm 1 Maximal Correlation Algorithm. K: the number of models in the BWM; L: the order of each model; N: the full length of the training set; N': batch size; $\phi$: the chosen nonlinear function; $\beta_1$, $\beta_2$ and $\beta_3$: the chosen discount factors; $l_r$: learning rate.

---

Initialize K sets of parameters $\{\theta_1, \theta_2, \ldots \theta_K\}$ where each $\theta_k :=$ $(w_k, b_k) \in \{(w, b): w \in R^L, b \in R\}$
Initialize $m_0 \leftarrow 0$; $\hat{m}_0 \leftarrow 0$; $v_0 \leftarrow 0$; $\hat{v}_0 \leftarrow 0$; $c_0^k \leftarrow 0$ for $k \in \{1, 2 \ldots K\}$; $\hat{c}_0 \leftarrow 0$; $t \leftarrow 0$ Define $y_{n,k} := \phi(w_k^T x_n + b_k) - \frac{1}{K}\hat{m}_i$ and $y_n := \sum_{k=1}^{K} y_{n,k}$ while $\{\theta_1, \theta_2, \ldots \theta_K\}$ not converge do
  $t \leftarrow t + 1$
  Sample a batch $\{(x_1, d_1), \ldots, (x_{N'}, d_{N'})\}$ from the dataset
  Compute $\{y_{1,1}, \ldots, y_{N',K}\}$ and $\{y_1, \ldots, y_n\}$ $m_i \leftarrow \beta_1 \cdot m_{t-1} + (1 - \beta_1) \cdot \frac{1}{N}\sum_{n=1}^{N'} y_n$ $\hat{m}_i \leftarrow m_i/(1 - \beta_1{}^3)$ $v_i \leftarrow \beta_2 \cdot v_{t-1} + (1 - \beta_2) \cdot \frac{1}{N'}\sum_{n=1}^{N'} y_n^2$ $\hat{v}_i \leftarrow v_i/(1 - \beta_1{}^3)$ $c_i \leftarrow \beta_3 \cdot c_{t-1} + (1 - \beta_3) \cdot \frac{1}{N'}\sum_{n=1}^{N'} (y_n d_n)$ $\hat{c}_i \leftarrow c_i/(1 - \beta_3{}^1)$
  for $k = 1, \ldots, K$ do $g_p^{(w)} = (1/\sqrt{\hat{v}_i}) \cdot \frac{1}{N'}\sum_{n=1}^{N'} d_n\phi'(w_k^T x_n + b_k)x_n$ $g_m^{(w)} = (\hat{c}_i/(\hat{v}_i)^{\frac{1}{3}}) \cdot \frac{1}{N'}\sum_{n=1}^{N'} y_n\phi'(w_k^T x_n + b_k)x_n$ -continued

---

Algorithm 1 Maximal Correlation Algorithm. K: the number of models in the BWM; L: the order of each model; N: the full length of the training set; N': batch size; $\phi$: the chosen nonlinear function; $\beta_1$, $\beta_2$ and $\beta_3$: the chosen discount factors; $l_r$: learning rate.

---

$w_k \leftarrow w_k + l_r \cdot (g_p^{(w)} - g_m^{(w)})$ $g_p^{(b)} = (1/\sqrt{\hat{v}_i}) \cdot \frac{1}{N'}\sum_{n=1}^{N'} d_n\phi'(w_k^T x_n + b_k)$ $g_m^{(b)} = (\hat{c}_i/(\hat{v}_i)^{\frac{1}{3}}) \cdot \frac{1}{N'}\sum_{n=1}^{N'} y_n\phi'(w_k^T x_n + b_k)$ $b_k \leftarrow b_k + l_r \cdot (g_p^{(b)} - g_m^{(b)})$
  end for
end while
If needed, compute the least-squares solution with the outputs $\{y_1, y_2, \ldots, y_N\}$ as the input and $\{d_1, d_2, \ldots, d_N\}$ as the target: Apply the trained model and this least-squares solution for the test set

---

As described above, the training samples may include and/or be associated with scalar-valued or one-dimensional target signals, and the DNN machine learning model is trained to have a L-to-1 dimensional mapping, in some example embodiments. For instance, the MCA described in Algorithm 1 may be adapted for such "single-target" applications.

In various other example embodiments, the target signals may be multi-dimensional, and the system behavior to be trained into the DNN machine learning model is a multiple-output system. To be specific, each target $d_n$ may be multi-variate in $\mathbb{R}^S$. In such embodiments, the target signal is S-dimensional. In such embodiments, for each $k \in \{1, \ldots, K\}$ and $s \in \{1, \ldots, S\}$, a Wiener model can be defined as $$h(x, k, s) = \phi(w_{k,s}^T x + b_{k,s}),$$

the parameter of which can be defined as $\theta_{k,s}$. As such, in some example embodiments, K×L models may be created for a nonlinear-model-based representation of a hidden layer. For each target $d(s)$, the correlation measure based at least in part on correlation ratio is described in Equation 20, which may be understood as an extension of Equation 12.

$$\tilde{R}\left(y(s) = \frac{1}{K}\sum_{k=1}^{K}[h(x_1, k, s), \ldots, h(x_n, k, s)]^T, d(s)\right) \qquad \text{Equation 20}$$

When considering all s, a maximization problem can be obtained, as described in Equation 21. With this, K Wiener models are employed for each dimension $s \in \{1, \ldots, S\}$ of a target signal $d(s)$.

$$\underset{\theta_{1,1}, \ldots, \theta_{K,S}}{\text{maximize}} \frac{1}{S}\sum_{s=1}^{S}\tilde{R}\left(\frac{1}{K}\sum_{k=1}^{K}[h(x_1, k, s), \ldots, h(x_n, k, s)]^T, d(s)\right) \qquad \text{Equation 21}$$

With the above, a systematic procedure to train one layer is provided to find the best projection space for a set of target signals, which may have one or more dimensions, and the computing entity 300 may be configured to perform the systematic procedure to configure or train each individual hidden layer of a DNN machine learning model. Determination of a correlation measure based at least in part on the correlation ratio enables direct training of a single layer of nonlinear units (e.g., Wiener models), each of which provides a projection space basis for the set of target signals. Because of this generality, the number of model components in a layer's nonlinear-model-based representation may not be the same as the number of targets (e.g., dimensionalities of a target signal), hence an extra output layer (e.g., using least squares techniques) is still needed to map the $K \cdot S$ outputs of the nonlinear-model-based representation to the S number of target signals. For example, application of a DNN machine learning model for time series analysis and for control applications (e.g., system identification) may particularly require the extra or final output layer. Returning to FIG. 2, the linear projector 214 is configured to find the orthogonal projection of the target signal set into the space of the BWM corresponding to the one hidden layer, for example. In order to accomplish this optimal projection, the weights of the Wiener models of the BWM are fixed, and a least-square solution may be implemented to obtain the best operating point in the BWM projection space for each target signal, in various embodiments. The combination of the nonlinear-model-based representations and the final projection or output layer becomes topologically identical to a single-hidden-layer MLP, although the modularized configuration framework 200 configures or trains the architecture one layer at a time. That is, the target signal set may still be used to set the optimal orientation of the projection space with the target signal set, but error is not backpropagated to the internal hidden layers.

To this point, the present disclosure has primarily discussed a modularized configuration framework involving use of the MCA for a DNN machine learning model with a single hidden layer for a single target signal and/or for multiple target signals. As will be appreciated by those of skill in the field of the present disclosure, various embodiments described herein can be extended to configure a DNN machine learning model with multiple hidden layers. Generally, each layer may be an individual module within the modularized configuration framework 200, and the modules are configured or trained in sequence, in various embodiments. In particular, sequential, independent configuration of the modules or layers entails fixing weights of a particular module after configuration before proceeding to configure a subsequent module and exploiting the output of the particular module as the input for the subsequent module. Modules subsequent to a first module may include delays (as shown by the G(z) blocks in FIG. 2) such that each subsequent module may also be represented as a nonlinear-model-based representation (e.g., a BWM). In various embodiments, each filter can be static such that the final DNN machine learning model shares a similar topology as a multi-layer MLP machine learning model. As discussed, a final output layer involving least-squares may be used to obtain the prediction for the target signal.

To describe modularized configuration of a DNN machine learning model having multiple hidden layers, the DNN machine learning model is represented as a model with M modules (each corresponding to a hidden layer of the DNN machine learning model), where the m-th module contains $K_m \cdot S$ models components (e.g., Wiener models) in its nonlinear-model-based representation. After training the (m−1)-th module, a set of outputs denoted by Equation 22 are obtained.

$$Z_{m-1} = \{h_{m-1}(x, 1, 1), \ldots, h_{m-1}(x, K_{m-1}, S)\} \qquad \text{Equation 22}$$

In Equation 22, each $h_{m-1}$ is a model component of a total $K_{m-1}$ number of model components in the nonlinear-model-based representation for the (m−1)-th module. A $h_{m-1}$ may alternatively be a simple static linear model followed by a nonlinear function, in some examples.

With the assumption that the previous (m−1) number of modules of the DNN machine learning model have been configured or trained, the weights or parameters of each of the previous (m−1) number of modules are fixed, and the global target signal (e.g., one-dimensional or multi-dimensional) is used to configure or train the weights of the m-th module using the first cost function 130A based at least in part on a correlation ratio, as described in Equation 21.

In various embodiments, each dimension of the obtained $z_{m-1}$ may be normalized to have a mean of 0 and a standard deviation of 1, and the normalized output can be denoted as $z'_{m-1}$. The normalized output $z'_{m-1}$ of the (m−1)-th module is then used to configure the subsequent modules, including the m-th module. A final projection layer, such as linear projector, may be implemented following configuration or training of all M modules to apply least-squares on a projection space to form a similar topology as a multi-hidden-layer DNN machine learning model.

Figures 4A, 4B, 4C:
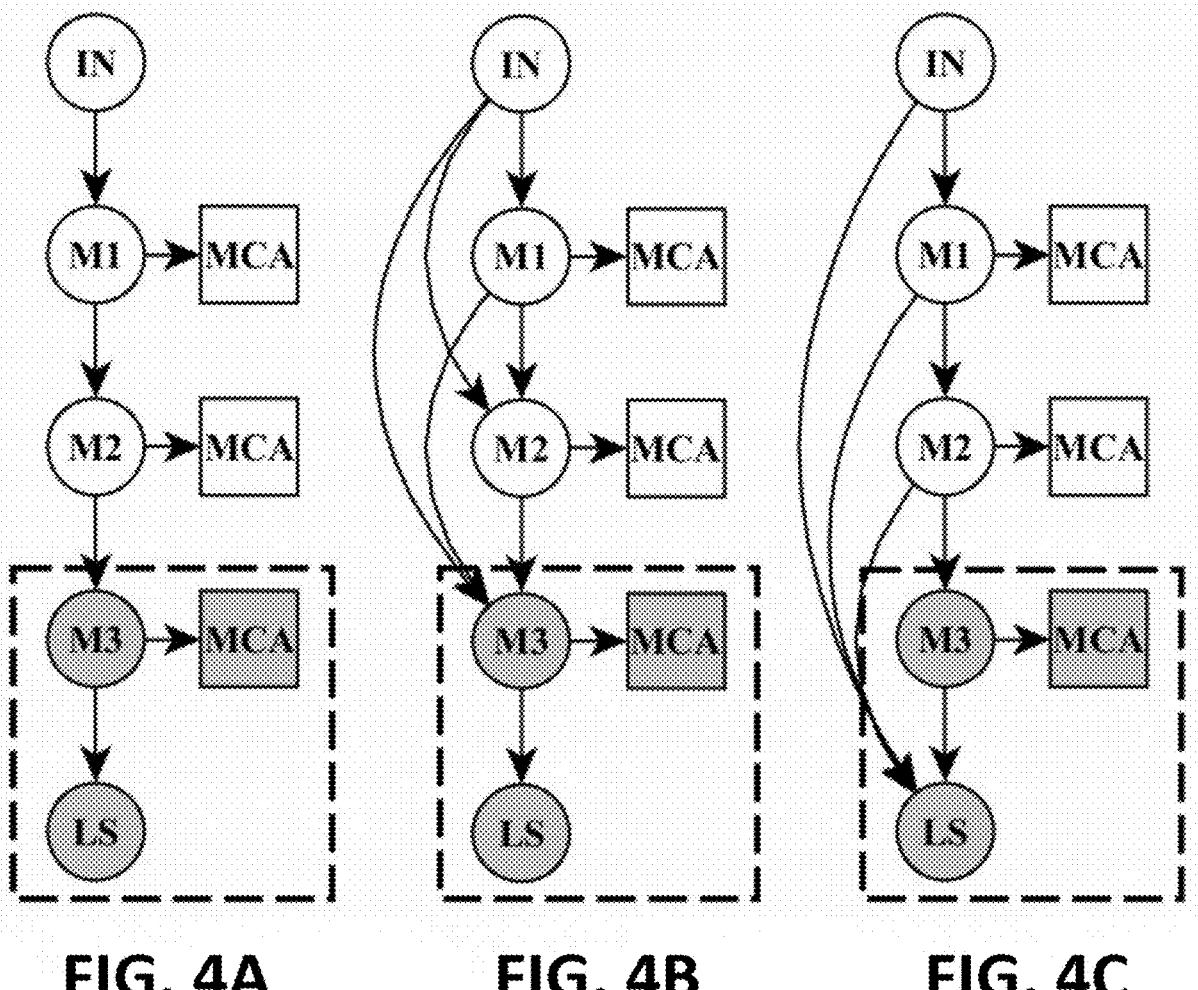

Each module configured within the modularized configuration framework 200 provides a scale of the input signal depending on how many nonlinear functions have already been applied to the input signal. Reasonably, various embodiments may utilize the full scale of the input signal to train each module or define the final projection space in order to obtain the best projection space. In doing so, various different cascading approaches may be used to utilize different scales of the input signal throughout configuration of each module and/or definition of the final projection space. FIGS. 4A-C illustrate three such example cascading approaches. In each of FIGS. 4A-C, modules M1 and M2 have been previously trained, and the different cascading approaches demonstrate how a module M3 can be trained. Shaded objects in each of FIGS. 4A-C represent parameters that will be updated when training the module M3. Across FIGS. 4A-C, the parameters of modules M1 and M2 are fixed, and each module is configured using the MCA cost function. In accordance with various embodiments described herein, each module or layer can be constructed as Wiener models, or static linear models followed by a nonlinear function.

FIG. 4A illustrates one example cascading approach that may be referred herein as the PLAIN approach. As shown in FIG. 4A, the output $z'_{m-1}$ of the (m−1)-th module is directly taken as the input $x_m$ to the m-th module. That is, in some example embodiments, $x_m$ is based at least in part on the output of one directly previous or preceding module. After the M modules (e.g., three in the illustrated embodiment) are configured and trained, the least-squares technique or solution ("LS") is applied on the final module output $$z'_M$$

to find the best linear projection from the target signal D to the projection space spanned by $$\mathcal{Z}'_M.$$

FIG. 4B illustrates another example cascading approach that may be referred herein as the CAS-I approach. As shown in FIG. 4B, all outputs $$\{\mathcal{Z}'_1, \dots, \mathcal{Z}'_{m-1}\}$$

from all previous modules are cascaded as the input $\chi_m$ to the m-th module. That is, in some example embodiments, $\chi_m$ is based at least in part on the outputs of all previous or preceding modules. Similar to the PLAIN approach shown in FIG. 4A, the least-squares technique is applied on the final module output $$\mathcal{Z}'_M.$$

It may be appreciated that the final projection spaces given by both the PLAIN approach and the CAS-I approach have the same dimensionality.

FIG. 4C illustrates another example cascading approach that may be referred herein as the CAS-II approach. Configuration or training of each module may be performed similar to the PLAIN approach in which the output of the one preceding module is directly used as the input for one subsequent module. However, as shown in FIG. 4C, the CAS-II approach involves cascading the outputs of all modules after training all the modules to form $$\mathcal{Z}' = \{\mathcal{Z}'_1, \dots, \mathcal{Z}'_M\},$$

and the least-squares technique is applied on $\mathcal{Z}'$. In this regard, the obtained model with have a similar topology as a MLP machine learning model but with the additional capability of utilizing the full information obtained from all layers (e.g., or modules) in a forward manner without relying on a backpropagated gradient.

Thus, various embodiments described herein enable full configuration of hidden layers and a final projection or output layer of a DNN machine learning model in a modularized manner using correlation measures (specifically correlation ratio). In various embodiments, a nonlinear-model-based representation may be understood as a universal mapper if K is sufficiently large.

To further demonstrate the validity and applicability of the modularized configuration framework 200, MCA and least-square estimation (both linear and nonlinear) can be demonstrated to be related. Given two random variables and Equation 23 can be written for a multivariate case.

$$C(\xi, \eta) = M(\xi\eta^\top) - M(\xi)M(\eta)^\top \qquad \text{Equation 23}$$

It may be understood by those of skill in the field of the present disclosure that the least-squares technique is given by $w(\xi \rightarrow \eta) = C(\xi,\xi)^{-1}C(\xi, \eta)$. Equation 24 can then be obtained based at least in part on substituting optimal weights into the error.

$$e(\xi \rightarrow \eta)e^\top(\xi \rightarrow \eta) = (\eta - w^\top(\xi \rightarrow \eta)\eta)^\top(\eta - w^\top(\xi \rightarrow \eta)\eta) \quad \text{Equation 24}$$

$$= C(\eta, \eta) - C(\xi, \eta)^\top C(\xi, \xi)^{-1} C(\xi, \eta)$$

For example instance in which $\xi$ and $\eta$ are in $\mathbb{R}$, Equation 24 can be written as Equation 25.

$$e^2(\xi \rightarrow \eta) = D(\eta) - \frac{1}{D(\eta)}(M(\xi \cdot \eta) - M(\xi) \cdot M(\eta)) \qquad \text{Equation 25}$$

From Equation 25, the relationship described in Equation 26 can be obtained.

$$\frac{e^2(\xi \rightarrow \eta)}{D(\eta)} = \frac{e^2(\eta \rightarrow \xi)}{D(\xi)} = 1 - R^2(\xi, \eta) \qquad \text{Equation 26}$$

It will be recognized then that, in example instances in which $D(\eta)=1$ and $D(\xi)=1$ are both satisfied by normalization, minimization of $1-R^2(\xi, \eta)$ is equivalent to minimization of the MSE considering both of the two directions between $\xi$ and $\eta$. Given application of functions $f$ and $g$ to create a nonlinear model, Equation 26 can be written as Equation 27.

$$\frac{e^2(f(\xi) \rightarrow g(\eta))}{D(g(\eta))} = \frac{e^2(g(\eta) \rightarrow f(\xi))}{D(f(\xi))} = 1 - R^2(f(\xi), g(\eta)) \qquad \text{Equation 27}$$

With this, the maximal correlation can be shown to follow Equation 28.

$$S^2(\xi, \eta) =$$
$$1 - \inf_{f,g}\left(\frac{e^2(f(\xi) \rightarrow g(\eta))}{D(g(\eta))}\right) = 1 - \inf_{f,g}\left(\frac{e^2(g(\eta) \rightarrow f(\xi))}{D(f(\xi))}\right) \qquad \text{Equation 28}$$

Similarly, the correlation ratio can be provided by Equation 29.

$$\Theta^2_\xi(\xi, \eta) = 1 - \inf_f\left(\frac{e^2(f(\xi) \rightarrow \eta)}{D(\eta)}\right) = 1 - \frac{1}{D(\eta)}\inf_f\left(e^2(f(\xi) \rightarrow \eta)\right) \qquad \text{Equation 29}$$

As shown, the correlation measure used in MCA considers the MSE from both directions between the nonlinear model and the target signal. Comparing with the error given by the least-squares technique which finds the best linear projection, the functions in Equation 28 and Equation 29 may yield a smaller error than $e(\xi \rightarrow \eta)$ and $e(\eta \rightarrow \xi)$. Because the nonlinear-model-based representation (e.g., a BWM) is universal, the optimal nonlinear least-squares estimator (NLSE) solution can be achieved by optimizing a pseudo-concave cost function (e.g., the MCA cost function).

With the above, various embodiments relating to determining a correlation measure, representing hidden layers of a DNN machine learning model as nonlinear-model-based representation, and individually configuring hidden layers of a DNN machine learning model have been provided. Referring now to FIG. 5, a comprehensive process 500 in accordance with the modularized configuration framework 200 for configuring or training a DNN machine learning model is provided. Specifically, the process 500 illustrated in FIG. 5 includes example operations for configuring or training a DNN machine learning model in a modularized manner using a correlation measure (e.g., the correlation ratio) with one or more training samples. In various embodiments, the computing entity 300 comprises means, such as processing element 305, non-volatile memory 310, volatile memory 315, network interface 320, and/or the like, for performing example operations of process 500.

As illustrated, process 500 includes step/operation 502, at which one or more sample data objects are received, each training sample including and/or associated with an input signal and a target signal. In various embodiments, the one or more sample data objects may be received by the computing entity 300 via a network interface 320 and may originate from another computing entity, a database, an apparatus, and/or the like. In various embodiments, the one or more sample data objects may be received at the computing entity 300 via user input. As understood, a target signal may refer to a desired response of the DNN machine learning model to the input signal. That is, a target signal may correspond to an input signal. A target signal can be scalar-valued or multi-dimensional.

At step/operation 504, a nonlinear-model-based representation for each of one or more hidden layers of the DNN machine learning model is identified. In various embodiments, the nonlinear-model-based representation for each hidden layer is a BWM with a configurable number of nonlinear models (e.g., Wiener models). The nonlinear-model-based representation for a hidden layer may be understood as an implementation of the projection space for the operation of a subsequent hidden layer. A nonlinear-model-based representation includes various weights and parameters that may be configured through the MCA or correlation-based configuration process.

At step/operation 506, the one or more hidden layers (or nonlinear-model-based representations thereof) are sequentially configured using the correlation measure (e.g., the correlation ratio). A particular hidden layer may be independently configured before configuring subsequent hidden layers of the selected subset. That is, in various embodiments, step/operation 506 for independently configuring a particular hidden layer may comprise determining a correlation measure based at least in part on (i) a layer output of the particular hidden layer in response to a given input signal or a set of outputs from previously or already configured hidden layers cascaded to the particular hidden layer, and (ii) a given target signal corresponding to the given input signal. Configuring a particular hidden layer may further include modifying one or more of the weights or parameters of the nonlinear-model-based representation for the particular hidden layer and fixing the one or more modified parameters of the nonlinear-model-based representation for the particular hidden layer.

In various embodiments, the correlation measure is based at least in part on the correlation ratio, and the weights or parameters of the nonlinear-model-based representation are configured in accordance with the MCA or correlation-based configuration process (e.g., Algorithm 1). It may be appreciated that the layer output of the particular hidden layer may be directly based at least in part on the given input signal if the particular hidden layer is the first and/or only hidden layer of the DNN machine learning model, for example. In another example, the layer output of the particular hidden layer may be based at least in part on the given input signal as well as other layer outputs from one or more preceding hidden layers, if the DNN machine learning model is associated with the layer cascade implementation identified herein as CAS-I (and illustrated in FIG. 4B). In any regard, the correlation measure may be configured to describe the statistical dependence between the layer output and the target signal, and may be used to configure or train the particular hidden layer.

In various embodiments, the hidden layers are trained individually, independently, and sequentially. Upon fully configuring or training the particular hidden layer, for example, the weights and parameters of the particular hidden layer are fixed before training the subsequent hidden layers.

Following configuration or training of the one or more hidden layers of the DNN machine learning model, a final projection or output layer of the DNN machine learning model may be configured, such that the DNN machine learning model provides an output with the dimensionality in accordance with that of target signals. In some example embodiments, the final projection or output layer of the DNN machine learning model is a linear projector.

At step/operation 508 then, the performance of one or more automated tasks is initiated using the (fully configured) DNN machine learning model. With the layers (e.g., hidden layers, the output layers) of the DNN machine learning model being configured for a particular task in accordance with the input signals and the target signals, the DNN machine learning model may be configured to automatically provide a predicted output based at least in part on receiving an input signal. In various embodiments, the automated tasks that are performed using the DNN machine learning model may include classification tasks, regression tasks, time series prediction tasks, system identification tasks, and/or the like.

Thus, with process 500 and the modularized configuration framework 200, various embodiments of the present disclosure provide improved configuration or training of DNN machine learning models. In particular, the modularized configuration framework 200 (and similarly the process 500) provide technical advantages in improved computational efficiency, as training of a DNN machine learning model in accordance with the modularized configuration framework 200 may have improved guarantees of optimality and improved convergence, leading to less overall computational resources and time spent training DNN machine learning models.

V. EXEMPLARY STUDIES

Various embodiments of the present disclosure are generally directed to modularized configuration or training of a DNN machine learning model. With modularized configuration or training of a DNN machine learning model, which may include one or more hidden layers, a correlation measure between a hidden layer's output and a target signal is used for individual configuration of the hidden layer, as an alternative to using errors between final model outputs and target signals to configure multiple hidden layers simultaneously.

Through modularized configuration or training in accordance with various embodiments of the present disclosure, a DNN machine learning model may be applied and implemented for regression tasks, time series analyses, and system identification tasks. In the present disclosure, various example studies are described, and these example studies demonstrate effectiveness of modularized configuration in training a DNN machine learning model for such tasks. The present disclosure further describes additional example studies which demonstrate improved computational efficiency and other technical advantages in individual training of a single layer or modularized training of hidden layers of a DNN machine learning model in accordance with various embodiments described herein. Throughout example studies described in the present disclosure, both one-dimensional target signals and multi-dimensional target signals are considered.

A. Training Performance

In a first example study, application of a DNN machine learning model in regression tasks and time series analysis is examined, the DNN machine learning model being configured in accordance with various embodiments described herein, such as in accordance with Algorithm 1. That is, hidden layers of the DNN machine learning model are each structured or represented as a nonlinear model-based representation, such as a BWM, and the least-squares technique was implemented for the final projection or output layer. The first example study involved example target signals being one-dimensional and other example target signals which were multi-dimensional. In all, this example study examined application of the correlation-based configuration process (e.g., the MCA detailed in Algorithm 1) for training DNN machine learning models for single-input-single-output (SISO) applications, single-input-multiple-output (SIMO) applications, multiple-input-single-output (MISO) applications, and multiple-input-multiple-output (MIMO) applications.

In the first example study, various datasets were employed, which included MISO regression datasets: the Friedman dataset and the housing and diabetes datasets from the University of California Irvine (UCI) machine learning repository. Datasets for SISO time series analysis were also used, and these datasets are the Lorenz system, the SantaFe Laser Intensity dataset, and the Sunspot Activities dataset. In the first example study, for time series modeling, the desired response is set to be the sample that is one step in the future of a corresponding input signal. Additional detail and explanation for each dataset is herein provided.

For the Friedman dataset, the input signal x is four-dimensional, and each dimension of x is sampled from a uniform distribution in a certain range. A nonlinear function is applied to the input signal x to construct the target signals. According to the range of the input and the type of nonlinearity, three datasets F1, F2, F3 are generated. Each dataset comprises 20,000 sample pairs. The housing dataset includes a California Housing (CH) and Boston Housing (BH), and for both, the input signals x are various factors (e.g., crime rates), and the target signals are house prices. For the CH dataset, the input signal is 8-dimensional with 20640 samples. For the BH dataset, the input signal is 13-dimensional with 506 samples. The diabetes (DB) dataset includes input signals x for blood measurements and the target signal is disease progression. For the DB dataset, the input signal x is 10-dimensional with 442 samples. As discussion, the F1, F2, F3, CH, BH, and DB datasets may be employed for studying MISO regression applications, and MIMO applications can also be created with these datasets through regression on multiple target signals.

The Lorenz system includes a model that is built from three ordinary differential equations, each described in Equation 30.

$$\frac{dx}{dt} = \sigma(y - x); \quad \frac{dy}{dt} = x(\rho - z) - y; \quad \frac{dz}{dt} = \sigma(y - x) \qquad \text{Equation 30}$$

Using this Lorenz model, twenty-thousand samples are generated with parameters $\{\sigma == 10, \rho = 28, \beta = 2.667\}$ and initial conditions $\{x_0 = 0, y_0 = 1, z_0 = 1.05\}$ with a sampling frequency of 100 Hz. Then, $x_n$ is used as the hidden state, the signal $y_n$ is used as the observation, and $z_n$ is used as the target.

In the SantaFe Laser Intensity (LASER) dataset, a time series is taken from real measurements of the intensity of a far-infrared NH3 laser. The time series includes around ten thousand samples. In the Sunspot Activities (SUNSPOT) dataset, the monthly mean of total sunspot numbers from the year 1700 to present year is used as the dataset. SIMO problems can be created through adaptation of this SUNSPOT dataset by setting multiple-time-step predictions as the target signal.

In the first example study, two baselines were used, and the structure of the DNN machine learning model is kept the same across the baselines and during modularized configuration or training. Various embodiments of the present disclosure involve use of a correlation ratio as a correlation measure by which model layers are individually trained, and the first example study evaluates performance of the correlation as the correlation measure in contrast with MSE and the correlation coefficient. The first baseline of this example study may be identified throughout as "MSE/BP", and the first baseline involves a single-hidden-layer MLP machine learning model with the same number of units and nonlinearity as in a BWM, and the single-hidden-layer MLP machine learning model is trained using backpropagation and MSE. The second baseline is identified throughout the present disclosure as "QMI", in which a type-II E-QMI is used. In the first example study, the kernel size is 1.

For the CH, BH, and DB datasets, the number of models K within a nonlinear model-based representation (e.g., a BWM) is set to 2 to prevent overfitting. K is set to 3 for the LORENZ dataset, and K is set to 6 for the other datasets. For the time series, the order of the filters was chosen to be L=10. The nonlinear component of the models of a nonlinear model-based representation, or a BWM, is chosen to be a logistic sigmoid function $$\phi(x) = \frac{1}{1 + e^{-x}}.$$

For each dataset, 70% of the samples are used for training, and the remaining 30% are used for testing to prevent overfitting. It was found that the QMI baseline works better with a large batch size The batch size is chosen to be 64 for the MSE/BP baseline and the correlation-based configuration process (MCA) in accordance with various embodiments described herein. IT was found that the QMI baseline works better with a large batch size, and the QMI baseline begins with a batch size of 64, which increases to 300 or 600 for better results. This example study uses the Adam optimizer and a learning rate of $1 \times 10^{-3}$ for the MSE/BP baseline, while a learning rate of 0.1 or 0.01 is used for the correlation-based configuration process and the QMI baseline. The example study further involves $\beta_1 = 0.9$, $\beta_2 = 0.999$, and $\beta_3 = 0.999$. The model is trained for ten thousand iterations in each experiment in the first example study, and training is stopped at the 10 k-th iteration. Each experiment was ran ten times, and the mean value and the standard deviation was obtained. All hyperparameters of each model is fine-tuned for best results. The main results for the first example study are shown in the below Table 1.

TABLE 1

| | Algorithm | F1 | F2 | F3 | CH | BH |
|---|---|---|---|---|---|---|
| | | | | Datasets | | |
| TRAIN MSE | MSE/BP | 0.0031 ±0.0034 | 9.2 × 10−5 ±2.6 × $10^{-5}$ | 0.0098 ±7.5 × $10^{-4}$ | 0.079 ±8.6 × $10^{-4}$ | 0.012 ±8.2 × $10^{-5}$ |
| | MCA | 0.0033 ±0.0016 | 2.3 × $10^{-4}$ ±6.7 × $10^{-5}$ | 0.007 ±6.7 × $10^{-4}$ | 0.08 ±0.0011 | 0.013 ±6.8 × $10^{-4}$ |
| | QMI | 0.0027 ±0.0033 | 4.0 × $10^{-4}$ ±1.7 × $10^{-4}$ | 0.01 ±7.8 × $10^{-4}$ | 0.12 ±0.043 | 0.016 ±6.9 × $10^{-4}$ |
| TEST MSE | MSE/BP | 0.0031 ±0.0035 | 9.4 × 10−5 ±2.8 × $10^{-5}$ | 0.0098 ±8.1 × $10^{-4}$ | 0.098 ±0.0012 | 0.074 ±0.0065 |
| | MCA | 0.0034 ±0.0017 | 2.3 × $10^{-4}$ ±7.3 × $10^{-5}$ | 0.007 ±7.1 × $10^{-4}$ | 0.1 ±0.0029 | 0.094 ±0.014 |
| | QMI | 0.0027 ±0.0033 | 3.9 × $10^{-4}$ ±1.5 × $10^{-4}$ | 0.01 ±0.0011 | 0.49 ±0.06 | 0.098 ±0.041 |
| TRAIN CC | MSE/BP | 0.987 ±0.015 | 1.0 ±6.5 × $10^{-5}$ | 0.969 ±0.0024 | 0.794 ±0.0024 | 0.954 ±0.0024 |
| | MCA | 0.986 ±0.0069 | 0.999 ±1.8 × $10^{-4}$ | 0.978 ±0.0021 | 0.792 ±0.0033 | 0.952 ±0.0026 |
| | QMI | 0.988 ±0.014 | 0.999 ±4.4 × $10^{-4}$ | 0.968 ±0.0025 | 0.605 ±0.0076 | 0.94 ±0.0027 |
| TEST CC | MSE/BP | 0.987 ±0.015 | 1.0 ±7.1 × $10^{-5}$ | 0.97 ±0.0023 | 0.778 ±0.0029 | 0.786 ±0.022 |
| | MCA | 0.986 ±0.007 | 0.999 ±1.9 × $10^{-4}$ | 0.978 ±0.0023 | 0.764 ±0.0075 | 0.737 ±0.044 |
| | QMI | 0.988 ±0.014 | 0.999 ±4.0 × $10^{-4}$ | 0.968 ±0.0032 | 0.527 ±0.01 | 0.752 ±0.014 |

| | Algorithm | DB | LORENZ | LASER | SUNSPOT |
|---|---|---|---|---|---|
| | | | Datasets | | |
| TRAIN MSE | MSE/BP | 0.11 ±0.0011 | 0.033 ±0.0011 | 0.0019 ±5.8 × $10^{-4}$ | 0.016 ±5.9 × $10^{-5}$ |
| | MCA | 0.01 ±0.0014 | 0.017 ±2.7 × $10^{-4}$ | 0.0022 ±5.1 × $10^{-4}$ | 0.016 ±4.6 × $10^{-5}$ |
| | QMI | 0.11 ±0.0019 | 0.019 ±6.7 × $10^{-4}$ | 0.0036 ±4.0 × $10^{-4}$ | 0.016 ±4.5 × $10^{-5}$ |
| TEST MSE | MSE/BP | 0.11 ±0.0012 | 0.031 ±0.028 | 0.003 ±7.1 × $10^{-4}$ | 0.015 ±4.9 × $10^{-4}$ |
| | MCA | 0.11 ±0.0012 | 0.016 ±3.2 × $10^{-4}$ | 0.0032 ±7.4 × $10^{-4}$ | 0.015 ±2.0 × $10^{-4}$ |
| | QMI | 0.11 ±0.0016 | 0.018 ±8.8 × $10^{-4}$ | 0.0041 ±4.0 × $10^{-4}$ | 0.015 ±1.2 × $10^{-4}$ |
| TRAIN CC | MSE/BP | 0.742 ±0.0012 | 0.702 ±0.36 | 0.993 ±0.002 | 0.919 ±4.0 × $10^{-4}$ |
| | MCA | 0.754 ±0.0039 | 0.897 ±0.0018 | 0.992 ±0.0018 | 0.92 ±2.4 × $10^{-4}$ |
| | QMI | 0.734 ±0.0054 | 0.881 ±0.0028 | 0.987 ±0.0014 | 0.92 ±2.2 × $10^{-4}$ |
| TEST CC | MSE/BP | 0.725 ±0.0026 | 0.697 ±0.37 | 0.987 ±0.0031 | 0.945 ±4.0 × $10^{-4}$ |
| | MCA | 0.722 ±0.003 | 0.899 ±0.0021 | 0.986 ±0.0033 | 0.945 ±4.1 × $10^{-4}$ |
| | QMI | 0.711 ±0.0046 | 0.884 ±0.0027 | 0.982 ±0.0022 | 0.946 ±2.0 × $10^{-4}$ |

It was found that the two baselines and the correlation-based configuration process (MCA) in accordance with various embodiments (e.g., Algorithm 1) perform at approximately the same level. All three Friedman datasets, the LASER dataset, and the SUNSPOT dataset can be solved nearly perfectly. For more difficult datasets, such as CH, BH, DB, and LORENZ datasets, performance decreased as expected. For the LORENZ dataset in particular, there exist cases in which the MSE/BP baseline might diverge with certain initialization, while the MCA approach remains consistently stable.

FIG. 6 illustrates the training curve and testing error at each iteration of a typical run for the MCA approach for the F3 dataset, the CH dataset, and the LASER dataset to further demonstrate the characteristics of the MCA or correlation-based configuration process. FIG. 6 shows that the QMI baseline and the MCA approach consistently show a faster convergence rate than the MSE/BP baseline, although the QMI baseline and the MCA approach do not directly minimize MSE. The final CC given by the MCA approach and the QMI baseline is equivalent to or outperforms the MSE/BP baseline. Thus, this example study demonstrates better robustness of the MCA or correlation-based configuration process (e.g., Algorithm 1) and the QMI baseline that uses all of the statistical information of the input signal for adaptation, while also demonstrating brittleness of the MSE/BP baseline. The reduction of the spurious correlation in the adaptation of nonlinear-model-based representation, or BWM, could also potentially explain the much faster convergence rate of the QMI baseline and the MCA or correlation-based configuration process. It may be appreciated that the Adam optimizer was used for the MSE/BP baseline to produce the best result using backpropagation. Although the QMI baseline and the correlation-based configuration process do not need to calculate the mean/standard deviation of the gradient, they show a much faster convergence rate compared to the MSE/BP baseline.

Next, the impact of K, or the number of models in a nonlinear-model-based representation (e.g., BWM) of a hidden layer, on the MCA or correlation-based configuration process is demonstrated. In this demonstration, the LORENZ dataset is used. Also in this demonstration, an initialization is chosen such that the MSE/BP baseline can be trained successfully. Both the MSE/BP baseline and the MCA approach are ran until convergence. Table 2 describes the best results from multiple runs. As understood from Table 2, the number of models, or K, does not impact the performance of the MCA or correlation-based configuration process (e.g., Algorithm 1).

TABLE 2

|  | Algorithm | K = 3 | K = 6 | K = 9 | K = 12 | K = 15 |
|---|---|---|---|---|---|---|
| TRAIN MSE | MSE/BP | 0.017 | 0.0085 | 0.0077 | 0.0066 | 0.0061 |
|  | MCA | 0.015 | 0.0077 | 0.0069 | 0.0058 | 0.0054 |
| TEST MSE | MSE/BP | 0.016 | 0.0077 | 0.0066 | 0.0058 | 0.0058 |
|  | MCA | 0.015 | 0.0068 | 0.0059 | 0.0052 | 0.0053 |
| TRAIN CC | MSE/BP | 0.903 | 0.953 | 0.958 | 0.965 | 0.967 |
|  | MCA | 0.907 | 0.958 | 0.964 | 0.968 | 0.968 |
| TEST CC | MSE/BP | 0.9 | 0.95 | 0.955 | 0.962 | 0.964 |
|  | MCA | 0.906 | 0.955 | 0.962 | 0.966 | 0.966 |

As discussed, the MCA or correlation-based configuration process (e.g., Algorithm 1) can be applied in an online implementation or with small batch sizes, which is enabled through the use of adaptive estimators. To demonstrate this applicability of the correlation-based configuration process, the batch size used in this example study was varied between 16 to 3000, and the resulting training curves were significantly similar. Since the gradient for configuring the DNN machine learning model is computed using a consistent statistical estimator, the results without adaptive estimators are also compared with the batch size fixed at 16. FIG. 7 demonstrates the results, which show that the convergence of training of the DNN machine learning model using the correlation-based configuration process is robust. FIG. 7 shows that the MCA or correlation-based configuration process works with a small batch size using adaptive moments estimators. While optimization techniques like Adam work directly with the variance of the gradients (making the estimators uninterpretable and inefficient to implement), the estimators used in the MCA or correlation-based configuration process work with the statistical quantities shown in Algorithm 1.

The example study further applies the MCA or correlation-based configuration process with multivariate regression and time series prediction tasks. The same parameters as the single-variate case are used, then the MCA or correlation-based configuration process is applied in accordance with various embodiments described herein with respect to multi-dimensional target signals. Specifically, S=2 is denoted when the target signals are two-dimensional, and S=3 is denoted when the target signals are three-dimensional. For multivariate regression tasks using the CH dataset, dimensions of the target signals include housing prices, latitude, and longitude. For the BH dataset, dimensions of the target signals are housing prices, LSTAT (lower status of the population), and MEDV (median value of owner-occupied homes). For time series such as the LASER dataset and the SUNSPOT dataset, multiple steps of the signal in the future are predicted, creating a SIMO-type model. Table 3 compares the performance of the MCA or correlation-based configuration process in multivariate regression and time series prediction tasks with the MSE/BP baseline.

TABLE 3

| Evaluation | Algorithm | Dataset | | | |
|---|---|---|---|---|---|
|  |  | CH | BH | LASER | SUNSPOT |
| S = 2 TRAIN CC | MSE/BP | 0.852 | 0.923 | 0.992 | 0.907 |
|  | MCA | 0.858 | 0.924 | 0.987 | 0.907 |
| TEST CC | MSE/BP | 0.835 | 0.678 | 0.985 | 0.932 |
|  | MCA | 0.845 | 0.640 | 0.977 | 0.933 |
| TRAIN MSE | MSE/BP | 0.055 | 0.019 | 0.0020 | 0.018 |
|  | MCA | 0.050 | 0.018 | 0.0030 | 0.018 |
| TEST MSE | MSE/BP | 0.076 | 0.12 | 0.0038 | 0.018 |
|  | MCA | 0.073 | 0.20 | 0.0052 | 0.017 |
| S = 3 TRAIN CC | MSE/BP | 0.409 | 0.817 | 0.983 | 0.896 |
|  | MCA | 0.413 | 0.805 | 0.974 | 0.900 |
| TEST CC | MSE/BP | 0.295 | 0.525 | 0.974 | 0.927 |
|  | MCA | 0.233 | 0.617 | 0.964 | 0.928 |
| TRAIN MSE | MSE/BP | 0.130 | 0.024 | 0.0047 | 0.020 |
|  | MCA | 0.128 | 0.026 | 0.0053 | 0.018 |
| TEST MSE | MSE/BP | 0.211 | 0.200 | 0.007 | 0.021 |
|  | MCA | 0.227 | 0.276 | 0.008 | 0.020 |

It can be seen from Table 3 that the MCA or correlation-based configuration process can produce very competitive results in multivariate regression and time series prediction tasks. Particularly for the CH dataset, prediction of both latitude and the longitude without giving any geographic information is considered highly difficult. Both the MSE/BP baseline and the MCA approach suffer a performance drop. However, the MCA approach still outperforms the MSE/BP baseline on the training set.

B. Modularity

In a second example study, the performance of the MCA or correlation-based configuration process with respect to training DNN machine learning models having a plurality of hidden layers is investigated. As previously discussed, various embodiments may involve the individual or modularized training of hidden layers; that is, the MCA or correlation-based configuration process may be applied to hidden layers of a DNN machine learning model individually and sequentially. In particular, the second example study was directed to (i) comparisons of the performance with the average values of MSE and CC through repeated experiments, (ii) comparisons of stability by comparing variance through repeated experiments on the LORENZ dataset, and (iii) comparisons of training time to reach a fixed level of error magnitudes.

In the second example study, the BH dataset and the CH dataset were chosen for regression tasks, and the LORENZ dataset and the SUNSPOT dataset were chosen for time series prediction tasks. Furthermore, two multi-target datasets were constructed from the BH dataset and the LORENZ dataset, respectively. For the multi-target dataset constructed from the BH dataset, the last two dimensions of the BH dataset (specifically the LSTAT variable and the MEDV variable) were selected as the regression target signals. Since the Lorenz system is defined with three variables, the $x_n$ variable is taken as the input signal to predict both the $y_n$ variable and the $z_n$ variable (e.g., the $y_n$ variable and the $z_n$ variable are chosen as the target signals). Thus, a multi-target prediction task is formed from the Lorenz system.

These two multi-target datasets constructed from the BH dataset and the LORENZ dataset respectively are denoted by BH-MT and LORENZ-MT.

The second example study includes experiments that follow the three cascading approaches described in FIGS. 4A-C, namely the PLAIN approach, the CAS-I approach, and the CAS-II approach. For experiments for each cascading approach, one module (e.g., a layer) is trained at a time. As previously described, the PLAIN approach involves taking the output of a given module as the input to the next or subsequent module. The CAS-I approach involves cascading outputs from all previous modules as the input to a given module. The CAS-II approach involves using outputs from all previous modules as the projection space for projection of the target signals with least-square solutions. In experiments for each cascading approach, each module is configured or trained according to the MCA or correlation-based configuration process. Upon configuration or training of each module, the output of a module is normalized to have a mean of 0 and a standard deviation of 1 before the output is used to train subsequent modules. In an example embodiment in which the DNN machine learning model is an MLP, the first module may be represented by a nonlinear-model-based representation (e.g., a BWM), while the following modules are constructed by static models. In this regard, the final model has a substantially similar topology as a multiple-hidden-layer MLP. In the second example study, the number of filters in each module is fixed to be $10 \times S$ for modules configured or trained according to each of the three cascading approaches. Each module is trained for 100 k iterations, and the total number of modules M is varied from one to five.

The results of configuring or training of DNN machine learning models according to the three cascading approaches are compared with training of an MLP with the same topology using backpropagation. A first baseline, identified herein as BP-PLAIN, involves training of an MLP that has the same topology as the models trained in the PLAIN approach and the CAS-II approach, in which the output of the first layer is directly taken as the input of the next layer. The entire network in the BP-PLAIN baseline is trained with backpropagation through minimization of MSE. In a BP-I baseline, a model having the same topology as CAS-I is trained, where outputs from all previous layers are cascaded into a new vector as the input to the next layer. This model is then trained using backpropagation through minimization of MSE. These baselines and the three cascading approaches are run five times, and the average mean values are taken to show performance. The number of layers M is varied from one to five, and each network is trained for 100 k iterations for the comparison. The learning rate was kept at $10^{-2}$ across all baselines and cascading approaches for fair comparison.

The comparison of the various embodiments with DNN machine learning models trained using other example methods on the task of single-target regression and time series prediction are presented in Table 4. The comparisons on the tasks on multi-target regression and time series prediction are presented in Table 5. The numerical results presented in both Table 4 and Table 5 are taken after repeating each experiment five times. The cascading approaches in accordance with various embodiments described herein have better performance than backpropagation in nearly all experiments. Compared with the BP-PLAIN baseline, the CAS-II approach achieves a better performance for nearly all M, especially on datasets such as the CH dataset and the SUNSPOT dataset. Compared with the BP-I baseline, CAS-I achieves significant performance in nearly all datasets.

TABLE 4

| Dataset | Algorithm | MSE | | | | | CC | | | | |
|---|---|---|---|---|---|---|---|---|---|---|---|
| | | M = 1 | M = 2 | M = 3 | M = 4 | M = 5 | M = 1 | M = 2 | M = 3 | M = 4 | M = 5 |
| BH | PLAIN | 0.21 | 0.096 | 0.096 | 0.091 | 0.09 | 0.933 | 0.962 | 0.962 | 0.963 | 0.964 |
| | CAS-I | 0.21 | 0.13 | 0.12 | 0.093 | 0.091 | 0.933 | 0.949 | 0.953 | 0.963 | 0.926 |
| | CAS-II | 0.19 | 0.084 | 0.16 | 0.31 | 0.41 | 0.938 | 0.966 | 0.937 | 0.915 | 0.898 |
| | BP-PLAIN | 0.16 | 0.15 | 0.19 | 0.16 | 0.17 | 0.934 | 0.939 | 0.925 | 0.935 | 0.932 |
| | BP-I | 0.17 | 0.14 | 0.36 | 0.44 | 0.29 | 0.934 | 0.945 | 0.866 | 0.843 | 0.919 |
| CH | PLAIN | 0.2 | 0.2 | 0.2 | 0.2 | 0.2 | 0.889 | 0.893 | 0.892 | 0.891 | 0.891 |
| | CAS-I | 0.2 | 0.19 | 0.18 | 0.19 | 0.2 | 0.889 | 0.897 | 0.9 | 0.899 | 0.893 |
| | CAS-II | 0.2 | 0.19 | 0.19 | 0.2 | 0.2 | 0.889 | 0.894 | 0.894 | 0.893 | 0.892 |
| | BP-PLAIN | 0.21 | 0.19 | 0.2 | 0.2 | 0.19 | 0.887 | 0.895 | 0.891 | 0.892 | 0.898 |
| | BP-I | 0.19 | 0.22 | 0.43 | 0.64 | 0.63 | 0.897 | 0.879 | 0.797 | 0.713 | 0.734 |
| LORENZ | PLAIN | 0.044 | 0.013 | 0.0079 | 0.0062 | 0.0055 | 0.977 | 0.993 | 0.996 | 0.997 | 0.997 |
| | CAS-I | 0.044 | 0.015 | 0.0049 | 0.002 | 0.00063 | 0.977 | 0.992 | 0.997 | 0.999 | 1.0 |
| | CAS-II | 0.044 | 0.013 | 0.0077 | 0.0061 | 0.0053 | 0.977 | 0.993 | 0.996 | 0.997 | 0.997 |
| | BP-PLAIN | 0.044 | 0.013 | 0.0079 | 0.014 | 0.024 | 0.977 | 0.993 | 0.996 | 0.993 | 0.989 |
| | BP-I | 0.049 | 0.0097 | 0.0057 | 0.0036 | 0.0016 | 0.975 | 0.995 | 0.996 | 0.999 | 0.999 |
| SUNSPOT | PLAIN | 0.14 | 0.17 | 0.18 | 0.19 | 0.19 | 0.918 | 0.906 | 0.899 | 0.895 | 0.893 |
| | CAS-I | 0.14 | 0.19 | 0.27 | 0.3 | 0.35 | 0.918 | 0.892 | 0.845 | 0.83 | 0.816 |
| | CAS-II | 0.14 | 0.16 | 0.17 | 0.18 | 0.18 | 0.921 | 0.908 | 0.903 | 0.899 | 0.897 |
| | BP-PLAIN | 0.56 | 0.22 | 0.48 | 0.27 | 0.29 | 0.767 | 0.881 | 0.793 | 0.853 | 0.84 |
| | BP-I | 0.15 | 0.22 | 0.43 | 0.64 | 0.63 | 0.916 | 0.879 | 0.797 | 0.713 | 0.734 |

TABLE 5

| Dataset | Algorithm | MSE | | | | | CC | | | | |
|---|---|---|---|---|---|---|---|---|---|---|---|
| | | M = 1 | M = 2 | M = 3 | M = 4 | M = 5 | M = 1 | M = 2 | M = 3 | M = 4 | M = 5 |
| BH-MT | PLAIN | 0.23 | 0.25 | 0.28 | 0.35 | 0.37 | 0.898 | 0.887 | 0.871 | 0.839 | 0.822 |
| | CAS-I | 0.23 | 0.29 | 0.36 | 0.45 | 0.49 | 0.898 | 0.874 | 0.845 | 0.804 | 0.786 |
| | CAS-II | 0.22 | 0.25 | 0.26 | 0.34 | 0.36 | 0.902 | 0.889 | 0.879 | 0.846 | 0.828 |

TABLE 5-continued

| Dataset | Algorithm | MSE | | | | | CC | | | | |
|---|---|---|---|---|---|---|---|---|---|---|---|
| | | M = 1 | M = 2 | M = 3 | M = 4 | M = 5 | M = 1 | M = 2 | M = 3 | M = 4 | M = 5 |
| | BP-PLAIN | 0.43 | 0.4 | 0.99 | 0.55 | 0.42 | 0.869 | 0.833 | 0.789 | 0.766 | 0.828 |
| | BP-I | 0.27 | 0.45 | 0.51 | 0.55 | 0.54 | 0.879 | 0.782 | 0.780 | 0.771 | 0.831 |
| LORENZ-MT | PLAIN | 0.041 | 0.016 | 0.0099 | 0.0048 | 0.0042 | 0.978 | 0.992 | 0.995 | 0.998 | 0.998 |
| | CAS-I | 0.041 | 0.011 | 0.0017 | 0.00087 | 0.00055 | 0.978 | 0.995 | 0.999 | 1.0 | 1.0 |
| | CAS-II | 0.037 | 0.015 | 0.0093 | 0.0036 | 0.003 | 0.981 | 0.992 | 0.995 | 0.998 | 0.998 |
| | BP-PLAIN | 0.036 | 0.0094 | 0.0059 | 0.0052 | 0.0041 | 0.983 | 0.995 | 0.997 | 0.998 | 0.998 |
| | BP-I | 0.037 | 0.0074 | 0.0023 | 0.0016 | 0.0013 | 0.979 | 0.996 | 0.999 | 0.999 | 0.999 |

From Table 5, although performance of the cascading approaches shown in FIGS. 4A-C decreases when M=1 and when M=2, the cascading approaches outperform back-propagation as M≥3. This may be due to the fact that the cascading approaches in accordance with various embodiments assign only half of the total model components (e.g., Wiener models) for each target as M=1, unlike an alternative DNN machine learning model (e.g., a MLP) trained by backpropagation that may use a full number of model components for defining the projection space. However, as an extra layer is added in accordance with various embodiments (e.g., the MCA), the outputs from all filters may be utilized as the input for the next module, which compensates for the lower accuracy in the first module, in various examples. As M≥3, the cascading approaches in accordance with various embodiments (e.g., the MCA) quickly outperform the other example DNN machine learning models trained using backpropagation regardless of the first module.

Since Tables 4 and 5 describe experiments mainly by average mean values, variance of the cascading approaches can be shown by presenting the mean values and variances of both the training set and the test set on the LORENZ dataset, as shown in Table 6. As can be seen in Table 6, the cascading approaches in accordance with various embodi-ments have a much lower variance and a much better performance. The CAS-I approach in particular shows a tremendous advantage as M=4 and M=5.

TABLE 6

| Algorithm | MSE ($\times 10^{-2}$) | | | | |
|---|---|---|---|---|---|
| | M = 1 | M = 2 | M = 3 | M = 4 | M = 5 |
| TRAIN PLAIN | 4.6 ± 0.15 | 1.4 ± 0.23 | 0.84 ± 0.21 | 0.64 ± 0.21 | 0.57 ± 0.2 |
| CAS-I | 4.6 ± 0.15 | 1.5 ± 0.22 | 0.48 ± 0.08 | 0.12 ± 0.073 | 0.06 ± 0.062 |
| CAS-II | 4.6 ± 0.14 | 1.4 ± 0.16 | 0.81 ± 0.18 | 0.62 ± 0.18 | 0.55 ± 0.19 |
| BP-PLAIN | 4.7 ± 0.15 | 1.4 ± 0.24 | 0.88 ± 0.23 | 1.6 ± 0.25 | 2.7 ± 0.69 |
| BP-I | 5.1 ± 0.11 | 1.1 ± 0.17 | 0.5 ± 0.15 | 0.14 ± 0.11 | 0.15 ± 0.095 |
| TEST PLAIN | 4.4 ± 0.19 | 1.3 ± 0.23 | 0.79 ± 0.23 | 0.62 ± 0.18 | 0.55 ± 0.15 |
| CAS-I | 4.4 ± 0.19 | 1.5 ± 0.28 | 0.49 ± 0.098 | 0.2 ± 0.088 | 0.063 ± 0.067 |
| CAS-II | 4.4 ± 0.16 | 1.3 ± 0.24 | 0.77 ± 0.29 | 0.61 ± 0.17 | 0.53 ± 0.16 |
| BP-PLAIN | 4.4 ± 0.23 | 1.3 ± 0.31 | 0.79 ± 0.39 | 1.4 ± 0.44 | 0.7924 ± 0.7 |
| BP-I | 4.9 ± 0.24 | 0.97 ± 0.23 | 0.57 ± 0.21 | 0.36 ± 0.17 | 0.16 ± 0.10 |

| Algorithm | CC ($\times 10^{-2}$) | | | | |
|---|---|---|---|---|---|
| | M = 1 | M = 2 | M = 3 | M = 4 | M = 5 |
| TRAIN PLAIN | 97.7 ± 0.08 | 99.3 ± 0.1 | 4.6 ± 0.15 | 99.7 ± 0.15 | 99.7 ± 0.1 |
| CAS-I | 97.7 ± 0.08 | 99.2 ± 0.1 | 99.8 ± 0.04 | 99.9 ± 0.02 | 100.0 ± 0.005 |
| CAS-II | 97.7 ± 0.07 | 99.3 ± 0.08 | 99.6 ± 0.09 | 99.7 ± 0.09 | 99.7 ± 0.1 |
| BP-PLAIN | 97.7 ± 0.09 | 99.3 ± 0.1 | 99.6 ± 0.1 | 99.2 ± 0.1 | 98.8 ± 0.3 |
| BP-I | 97.4 ± 0.06 | 99.5 ± 0.09 | 99.7 ± 0.06 | 99.9 ± 0.01 | 99.9 ± 0.01 |
| TEST PLAIN | 97.7 ± 0.09 | 99.3 ± 0.1 | 99.6 ± 0.1 | 99.7 ± 0.09 | 99.7 ± 0.15 |
| CAS-I | 97.7 ± 0.09 | 99.2 ± 0.1 | 99.7 ± 0.04 | 99.9 ± 0.02 | 100.0 ± 0.005 |
| CAS-II | 97.7 ± 0.07 | 99.3 ± 0.1 | 99.6 ± 0.1 | 99.7 ± 0.1 | 99.7 ± 0.09 |
| BP-PLAIN | 97.7 ± 0.01 | 99.3 ± 0.2 | 99.6 ± 0.1 | 99.3 ± 0.1 | 98.9 ± 0.03 |
| BP-I | 97.5 ± 0.01 | 99.5 ± 0.1 | 99.6 ± 0.05 | 99.9 ± 0.03 | 99.9 ± 0.03 |

Finally, the training time of the modularized configuration framework 200 and the cascading approaches are address. As the modularized configuration framework 200 involves training of a DNN machine learning model on a layer-by-layer basis, it may be assumed that the modularized configuration framework 200 may take longer time than training the DNN machine learning model at once by backpropagation. Thus, the training time of the modularized configuration framework 200 implemented via the three cascading approaches are compared directly with a backpropagation approach or baseline.

For fair comparison with the training time of backpropagation, the proper stopping criterion for training of each module is first introduced and defined. In Algorithm 1, three terms ($m_t$, $v_t$, and $c_t$) are defined for adaptive estimation of statistical quantities between the model outputs and the target signals. Here, the cross-correlation estimation $c_t$ is used to define the stopping criterion. At each iteration of training one module, another term $\delta_t = -\log((c_t - c_{t-1})^2 + 10^{-10})$ is defined. The same scheme is used such that $\bar{\delta}_t = \beta \bar{\delta}_{t-1} - (1-\beta)\bar{\delta}_t$. Next, $$\hat{\delta}_t = \frac{\delta_t}{(1 - \beta^t)}$$

is used to set the threshold for an early stopping procedure. It can be understood by those of skill in the field of the present disclosure that $\hat{\delta}_t$ corresponds to the estimated slope of the training curve. If $(c_t - c_{t-1})^2$ is large, the increment of $c_t$ is large, meaning that the parameters have not yet converged. If $(c_t - c_{t-1})^2$ is close to zero, then the training of the module should be stopped. In the second example study, the threshold for $\hat{\delta}_t$ is set to be 21.5. If that $\hat{\delta}_t > 21.5$, training of the current module is stopped, and the next module is then subsequently trained.

The modularized configuration framework is compared with a backpropagation approach, or the baseline, on the LORENZ dataset. With the modularized configuration framework 200, the three cascading approaches were used to train a five-hidden-layer DNN machine learning model. For each module, the stopping criterion as described above are used. The total time and the total iterations for training all five modules to obtain an MSE of $5 \times 10^{-3}$ are obtained. For comparison, a five-hidden-layer DNN machine learning model is trained according to the BP-PLAIN and the BP-I baselines, and the total time to reach an MSE of $5 \times 10^{-3}$ is counted.

The comparison is shown in Table 7. As shown in Table 7, the modularized configuration framework may involve a higher number of iterations, but the modularized configuration framework is highly competitive with regard to total running time. This may be due to the following two reasons. First, the modularized configuration framework trains hidden layers individually and sequentially; thus, the running time for one iteration of training in the modularized configuration framework is much shorter than one iteration of an alternative example training process in which all layers are trained simultaneously (e.g., backpropagation). Second, due to individual or modularized training of the layers of the DNN machine learning model, the time to converge is shorter. This lower convergence time may also be indicated in Tables 1 and 6.

C. System Identification Tasks

In a third example study, the potential in applying the modularized configuration framework 200 for system identification tasks is shown. In a regression or time series prediction task, the performance of a DNN machine learning model is quantified exclusively by the output errors, as in other typical machine learning applications. However, in the present disclosure, the performance of a DNN machine learning model is investigated from the perspective of system identification tasks, which address the quality of the internal representation achieved by configuration or training of the DNN machine learning model. In the third example study, the Wiener filters used in models of the nonlinear-model-based representations (e.g., BWMs) of modules are extended to a special class of IIR filters called gamma filters. Gamma filters use a first-order recurrent integrator as a delay operator, followed by a feedforward layer similar to FIR filters but with infinite impulse responses. This experimental approach is identified throughout as IIR-MCA.

Two systems were chosen for the experiments of the third example study directed to system identification. A first example system identified by SYSTEM-ST is a single-output system having a difference equation defined according to Equation 31. Within this first example system, a nonlinear function is applied after generating a signal with the difference equation of Equation 31. The nonlinear function is described by Equation 32.

$$H(z) = \frac{0.0563 - 0.0009z^{-1} - 0.0009z^{-2} + 0.0563z^{-3}}{1 - 2.1291z^{-1} + 1.7834z^{-2} - 0.5435z^{-3}} \qquad \text{Equation 31}$$

$$f_w(x) = \begin{cases} 0.05, & x > 0.05 \\ x, & -0.05 \leq x \leq 0.05 \\ -0.05, & x < -0.05 \end{cases} \qquad \text{Equation 32}$$

A second example system is identified herein as SYSTEM-MT, and SYSTEM-MT is a multiple-output system defined by the system equations described by Equation 33. The nonlinear function that is applied in SYSTEM-MT is chosen to be a sigmoid function.

TABLE 7

| | Algorithm | M = 1 | M = 2 | M = 3 | M = 4 | M = 5 | Total* |
|---|---|---|---|---|---|---|---|
| ITERS | PLAIN | 6057 | 11031 | 12965 | 42526 | 79689 | 152268 |
| | CAS-I | 6057 | 12877 | 15529 | 22206 | 53201 | 109870 |
| | CAS-II | 6057 | 11031 | 12965 | 42526 | 63770 | 136349 |
| | BP-PLAIN | — | — | — | — | 139507 | 139507 |
| | BP-I | — | — | — | — | 78396 | 78396 |
| TIME | PLAIN | 12.0 | 25.5 | 29.9 | 98.4 | 184.0 | 349.9 |
| (secs) | CAS-I | 12.0 | 26.9 | 34.6 | 51.3 | 127.2 | 252.0 |
| | CAS-II | 12.0 | 26.9 | 34.6 | 51.3 | 147.3 | 315.6 |
| | BP-PLAIN | — | — | — | — | 371.3 | 371.3 |
| | BP-I | — | — | — | 231.2 | 231.2 |

As shown in Table 7, the modularized configuration framework 200 remains highly competitive in terms of configuring and training an example DNN machine learning model (e.g., having five hidden layers). Furthermore, the performance of the modularized configuration framework 200 provides significantly improved convergence than the backpropagation approach or baseline, with an error at $6 \times 10^{-4}$. That is, according to various embodiments, the modularized configuration framework 200 delivers technically improved training of DNN machine learning models with little or no loss in training time.

$$H_1(z) = 1.0 + 1.0 \cdot \frac{0.8}{z - 0.2} + 1.2 \cdot \left(\frac{0.8}{z - 0.2}\right)^2 \qquad \text{Equation 33}$$

$$H_2(z) = -1.5 - 1.5 \cdot \frac{0.8}{z - 0.2} + 1.5 \cdot \left(\frac{0.8}{z - 0.2}\right)^2$$

Specifically, the goal of the third example study is to estimate the parameters in the difference equations of the two example systems (e.g., SYSTEM-ST and SYSTEM-MT) to thereby demonstrate system identification capabilities of the modularized configuration framework 200. In the third example study, a special class of IIR filters named gamma filters are used to construct the nonlinear-model-based representations (e.g., BWMs) for layers. To configure or train the parameters in the IIR filters, the third example study comprises the following three example steps. First, a Gaussian white noise signal sampled from $\mathcal{N}$ (0,0.1) is input to the true system (e.g., SYSTEM-ST and SYSTEM-MT) to obtain pairs of the input signal ($x_n$) and the target signal ($d_n$). Second, a prediction of the model including IIR filters is generated, the prediction defined as $y_n = f(x_1, \ldots, x_n)$. Since gamma filters are used, the complexity of $f$ is guarded by the order of the filters L. Algorithm 2 describes how the model prediction is generated. Third, the parameters of the IIR filters are configured or trained using the MCA or correlation-based configuration process (e.g., Algorithm 1) or using the backpropagation approach, or the baseline.

---

Algorithm 2
Generate $y_n$ with an L-order filter

---

Initialize $y_{0,0} = y_0$ and $\alpha_{0,0} = 0$
Initialize $y_{0,l} = 0$ and $\alpha_{0,l} = 0$ for $l = 1, 2 \ldots L - 1$
for $n = 1, 2, \ldots$ do
  $y_{n,0} = y_n$ and $\alpha_{n,0} = 0$
  for $l = 1, 2 \ldots L - 1$ do
    $Y_{n,l} = (1 - \mu) \cdot y_{n-1,l} + \mu \cdot y_{n-,l-1}$
    $\alpha_{n,l} = (1 - \mu) \cdot \alpha_{n-1,l} + \mu \cdot \alpha_{n-,l-1} = y_{n-1,l} + y_{n-1,l-1}$
  end for
end for

---

Table 8 shows the MSE and the CC (e.g., the correlation coefficient criterion) for system identification on the SYSTEM-ST system. As seen in Table 8, both the IIR-BP and the IIR-MCA achieve the same optimum by varying the order of the filters L.

TABLE 8

|  |  | Algorithm | L = 2 | L = 3 | L = 4 |
|---|---|---|---|---|---|
| SYSTEM-ST | MSE | IIR-BP | $4.2 \times 10^{-4}$ | $2.4 \times 10^{-4}$ | $1.6 \times 10^{-4}$ |
|  |  | IIR-MCA | $4.2 \times 10^{-4}$ | $2.4 \times 10^{-4}$ | $1.6 \times 10^{-4}$ |
|  | CC | IIR-BP | 0.803 | 0.896 | 0.962 |
|  |  | IIR-MCA | 0.803 | 0.896 | 0.962 |

However, as the IIR-BP and the IIR-MCA approaches are compared for the multiple-output system (e.g., for identifying SYSTEM-MT), the performance of the IIR-MCA approach (e.g., IIR filters trained by the MCA) is significantly better than the IIR-BP approach (e.g., IIR filters trained by the backpropagation or the baseline approach). It can be understood by those of skill in the field that poles and zeros are important representations for an IIR system. Further, the IIR-MCA approach is compared with the IIR-BP approach by their poles and zeros of the obtained IIR system. As shown in FIG. 8, the zeros given by the two approaches show a significant difference. FIG. 8 includes various plots, including a first plot (labelled "a") that shows the poles and zeroes given by the original system. After 10 k iterations, as both the IIR-BP and the IIR-MCA approaches have already converged to the best cost (e.g., MSE in IIR-BP and a correlation measure in IIR-MCA), FIG. 8 shows the zeros resulting from the IIR-MCA approach (in the plot labelled "d") as well as the zeros given by IIR-BP (in the plot labelled "b"). After 100 k iterations, which is 90 k iterations after the respective costs of the different approaches converge, the zeroes given by the IIR-MCA approach have an accurate concentration around the correct zeroes (as shown in the plot labelled "e"). Meanwhile, the zeros given by the IIR-BP approach as shown in the plot labelled "c" are significantly worse in comparison.

This example study then shows that training through backpropagation is not able to properly control internal representations, as specifically demonstrated in example system identification tasks. This deficiency of backpropagation may also occur in classification tasks; however, demonstrating this deficiency in classification tasks may be more difficult due to the models being much more complex than a Wiener model.

However, in various embodiments, the modularized configuration framework 200 may be hybridized and/or may incorporate aspects of backpropagation. In one example, several layers may form a first block that is trained or configured using backpropagation, and the output of the first block may be trained or configured using the MCA or a correlation-based configuration process. Once trained using backpropagation and the MCA, the parameters or weights for the first block may be fixed, upon which output from the configured first block may then be used in training subsequent blocks in the same manner as the first block.

VI. CONCLUSION

Various embodiments of the present disclosure provide a modularized configuration framework for configuring or training a DNN machine learning model comprising one or more hidden layers. In some examples, the modularized configuration framework can be adopted to identify multiple-input-multiple-output (MIMO) systems based at least in part on a correlation measure (e.g., the correlation ratio, maximal correlation), or by employing all statistical information about model outputs and the target signals. Maximal correlation is applied to directly estimate from statistical dependence of samples, leading to new perspectives for adaptive and learning systems. This correlation-based configuration process (also referred herein as MCA), unifies a model's mapping function and a cost function instead of using various conventional approaches, and further enables modularized training of DNN machine learning models with hidden layers as or in a similar manner to MLPs. In various examples, the correlation-based configuration process, or MCA, is competitive to conventional approaches involving backpropagation and MSE in terms of output error, and the correlation-based configuration process further provides better internal representations, as demonstrated in example system identification tasks. Finally, the correlation-based configuration process is pseudo-concave, which provides improved computational efficiency and provides guarantees of optimality. In some examples, Wiener models implemented in a nonlinear-model-based representation of a hidden layer of a DNN machine learning model may be substituted with similar Hammerstein models, because the parameter adaptation is linear with respect to the parameters.

It should be understood that the examples and embodiments described herein are for illustrative purposes only and that various modifications or changes in light thereof will be suggested to persons skilled in the art and are to be included within the spirit and purview of this application.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A computer-implemented method for configuring a deep neural network (DNN) machine learning model comprising one or more hidden layers and an output layer, the method comprising:

receiving, using one or more processors, one or more input signals and one or more target signals, wherein each of the one or more target signals corresponds to an input signal;

selecting, using the one or more processors and based at least in part on the one or input signals and one or more automated tasks, a nonlinear-model-based representation for each hidden layer of the DNN machine learning model, wherein the nonlinear-model-based representation comprises one or more parameters configured to be modified to configure a corresponding hidden layer;

sequentially configuring, using the one or more processors, at least a selected subset of the one or more hidden layers of the DNN machine learning model, wherein the selected subset comprises a particular hidden layer, and wherein the particular hidden layer is configured independently from, and before configuring subsequent hidden layers of the selected subset, by:

determining a correlation measure between (i) an output of the particular hidden layer in response to a given input signal, and (ii) a given target signal corresponding to the given input signal, modifying the one or more parameters of the nonlinear-model-based representation for the particular hidden layer based at least in part on maximizing the correlation measure, and fixing the one or more modified parameters of the nonlinear-model-based representation for the particular hidden layer such that the one or more modified parameters cannot be modified by configuring a subsequent hidden layer; and initiating performance of the one or more automated tasks using the DNN machine learning model.

2. The method of claim 1, wherein sequentially configuring the one or more hidden layers comprises fixing the modified parameters of the nonlinear-model-based representation for the particular hidden layer before modifying parameters of a nonlinear-model-based representation for a subsequent hidden layer.

3. The method of claim 1, wherein the output layer is a final projection layer that is configured subsequent to the sequential configuration of at least the selected subset of the one or more hidden layers of the DNN machine learning model, the output layer being configured based at least in part on a least square projection.

4. The method of claim 1, wherein the output layer is a final projection layer that is configured subsequent to the sequential configuration of at least the selected subset of the one or more hidden layers of the DNN machine learning model, the output layer being configured based at least in part on maximizing the correlation measure with the target signal.

5. The method of claim 1, wherein the correlation measure is a correlation ratio between (i) the layer output of the particular hidden layer in response to the given input signal, and (ii) the given target signal corresponding to the given input signal.

6. The method of claim 1, wherein a nonlinear-model-based representation for a hidden layer comprises a plurality of block-oriented nonlinear models.

7. The method of claim 6, wherein at least one of the plurality of block-oriented nonlinear models is a Hammerstein-Wiener model.

8. The method of claim 1, wherein at least one hidden layer of the DNN machine learning model is substituted by a nonlinear mapping of the one or more input signals to a reproducing kernel Hilbert space (RKHS) where a linear weighting of a plurality of projections is configured by maximizing the correlation measure with the target signal.

9. The method of claim 1, wherein the final projection layer is further configured using a combination of one or more outputs from the one or more hidden layers.

10. The method of claim 1, wherein the layer output of the particular hidden layer in response to the given input signal is determined directly from the output of a preceding hidden layer.

11. The method of claim 1, wherein the layer output of the particular hidden layer in response to the given input signal is determined based at least in part on a combination of one or more outputs of one or more preceding layers.

12. An apparatus for configuring a deep neural network (DNN) machine learning model comprising one or more hidden layers and an output layer, and the apparatus comprising at least one processor and at least one memory including program code, the at least one memory and the program code configured to, with the processor, cause the apparatus to at least:

receive one or more input signals and one or more target signals, wherein each of the one or more target signals corresponds to an input signal;

select, based at least in part on the one or input signals and one or more automated tasks, a nonlinear-model-based representation for each hidden layer of the DNN machine learning model, wherein the nonlinear-model-based representation comprises one or more parameters configured to be modified to configure a corresponding hidden layer;

sequentially configure at least a selected subset of the one or more hidden layers of the DNN machine learning model, wherein the selected subset comprises a particular hidden layer, and wherein the particular hidden layer is configured independently from, and before configuring subsequent hidden layers of the selected subset, by:

determining a correlation measure between (i) an output of the particular hidden layer in response to a given input signal, and (ii) a given target signal corresponding to the given input signal, modifying the one or more parameters of the nonlinear-model-based representation for the particular hidden layer based at least in part on maximizing the correlation measure, and fixing the one or more modified parameters of the nonlinear-model-based representation for the particular hidden layer such that the one or more modified parameters cannot be modified by configuring a subsequent hidden layer; and initiate performance of the one or more automated tasks using the DNN machine learning model.

13. The apparatus of claim 12, wherein the apparatus sequentially configures the one or more hidden layers by at least fixing the modified parameters of the nonlinear-model-based representation for the particular hidden layer before modifying parameters of a nonlinear-model-based representation for a subsequent hidden layer.

14. The apparatus of claim 12, wherein the output layer is a final projection layer that is configured subsequent to the sequential configuration of at least the selected subset of the one or more hidden layers of the DNN machine learning model, the output layer being configured based at least in part on a least square projection.

15. The apparatus of claim 12, wherein the output layer is a final projection layer that is configured subsequent to the sequential configuration of at least the selected subset of the one or more hidden layers of the DNN machine learning model, the output layer being configured based at least in part on maximizing the correlation measure with the target signal.

16. The apparatus of claim 12, wherein the correlation measure is a correlation ratio between (i) the layer output of the particular hidden layer in response to the given input signal, and (ii) the given target signal corresponding to the given input signal.

17. The apparatus of claim 12, wherein a nonlinear-model-based representation for a hidden layer comprises a plurality of block-oriented nonlinear models.

18. The apparatus of claim 17, wherein at least one of the plurality of block-oriented nonlinear models is a Hammerstein-Wiener model.

19. The apparatus of claim 12, wherein at least one hidden layer of the DNN machine learning model is substituted by a nonlinear mapping of the one or more input signals to a reproducing kernel Hilbert space (RKHS) where a linear weighting of a plurality of projections is configured by maximizing the correlation measure with the target signal.

20. The apparatus of claim 12, wherein the final projection layer is further configured using a combination of one or more outputs from the one or more hidden layers.

21. The apparatus of claim 12, wherein the layer output of the particular hidden layer in response to the given input signal is determined directly from the output of a preceding hidden layer.

22. The apparatus of claim 12, wherein the layer output of the particular hidden layer in response to the given input signal is determined based at least in part on a combination of one or more outputs of one or more preceding layers.

23. A computer program product comprising at least one non-transitory computer-readable storage medium having computer-readable program code portions stored therein, the computer-readable program code portions comprising:

an executable portion configured to receive one or more input signals and one or more target signals, wherein each of the one or more target signals corresponds to an input signal;

an executable portion configured to select, based at least in part on the one or input signals and one or more automated tasks, a nonlinear-model-based representation for each hidden layer of the DNN machine learning model, wherein the nonlinear-model-based representation comprises one or more parameters configured to be modified to configure a corresponding hidden layer;

an executable portion configured to sequentially configure at least a selected subset of the one or more hidden layers of the DNN machine learning model, wherein the selected subset comprises a particular hidden layer, and wherein the particular hidden layer is configured independently from, and before configuring subsequent hidden layers of the selected subset, by:

determining a correlation measure between (i) an output of the particular hidden layer in response to a given input signal, and (ii) a given target signal corresponding to the given input signal, modifying the one or more parameters of the nonlinear-model-based representation for the particular hidden layer based at least in part on maximizing the correlation measure, and fixing the one or more modified parameters of the nonlinear-model-based representation for the particular hidden layer such that the one or more modified parameters cannot be modified by configuring a subsequent hidden layer; and an executable portion configured to initiate performance of the one or more automated tasks using the DNN machine learning model.

* * * * *